May 20, 1952  O. E. HILL  2,597,242
CENTERLESS GRINDING MACHINE
Filed April 15, 1949  16 Sheets-Sheet 1

INVENTOR
OIVA E. HILL
BY George Crompton jr.
ATTORNEY

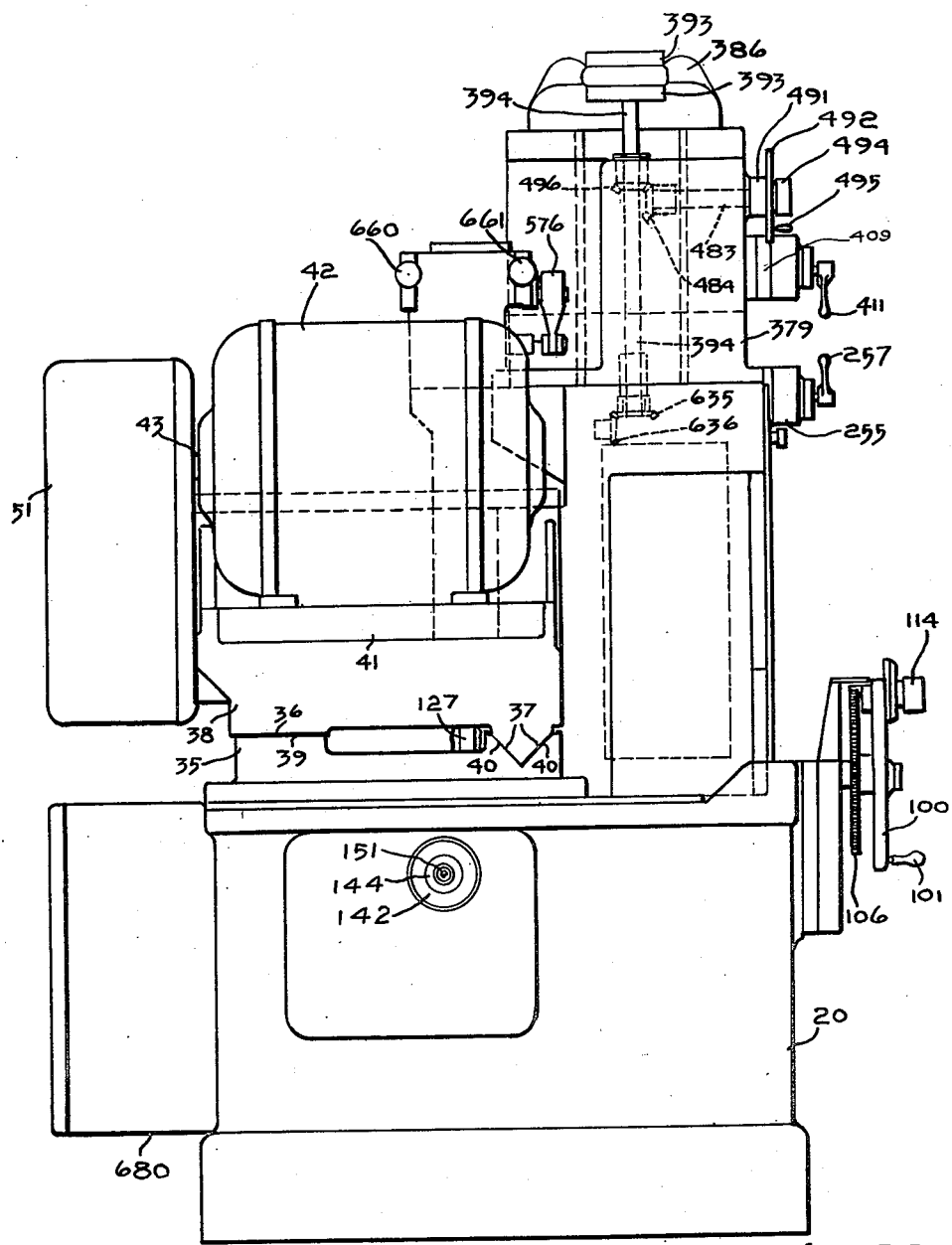

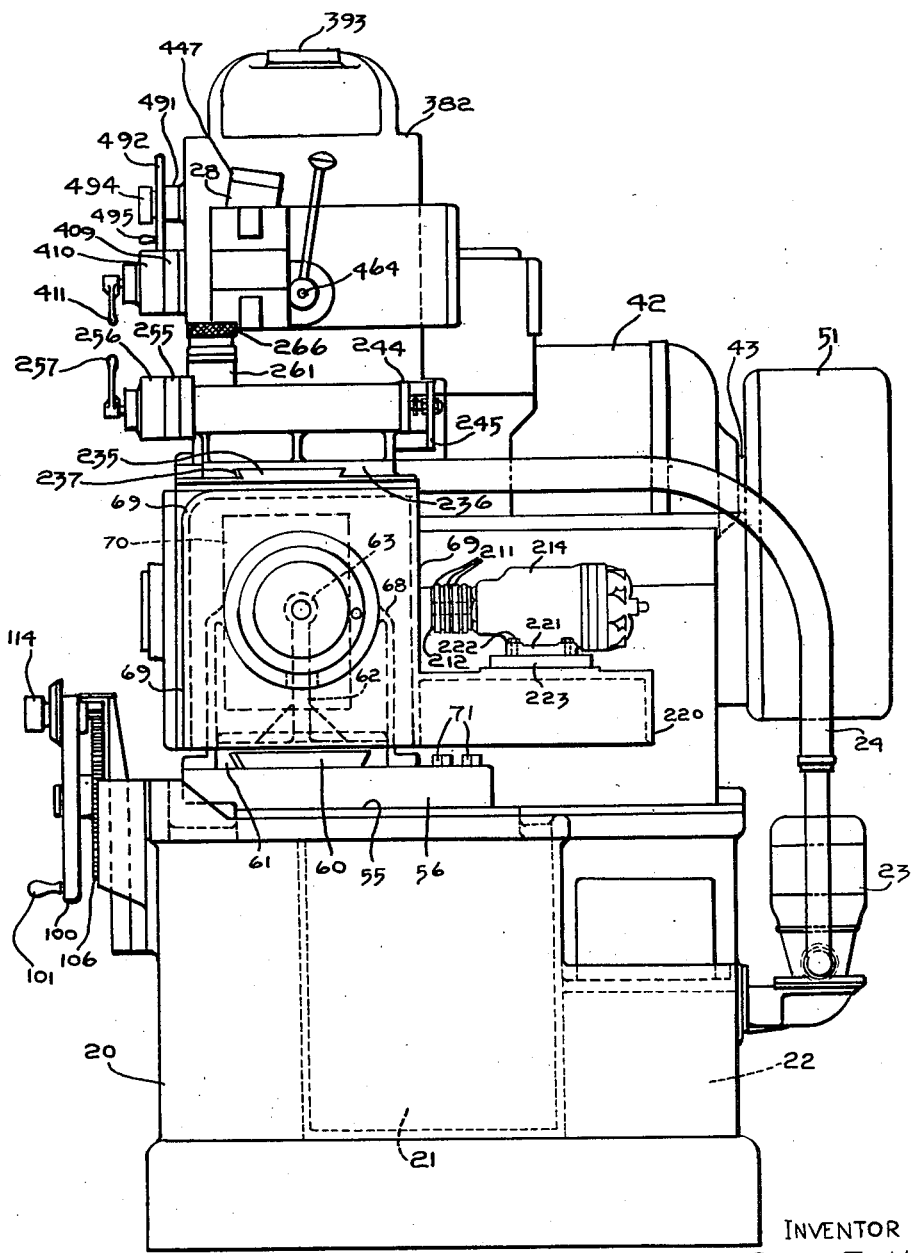

May 20, 1952 O. E. HILL 2,597,242
CENTERLESS GRINDING MACHINE
Filed April 15, 1949 16 Sheets-Sheet 4
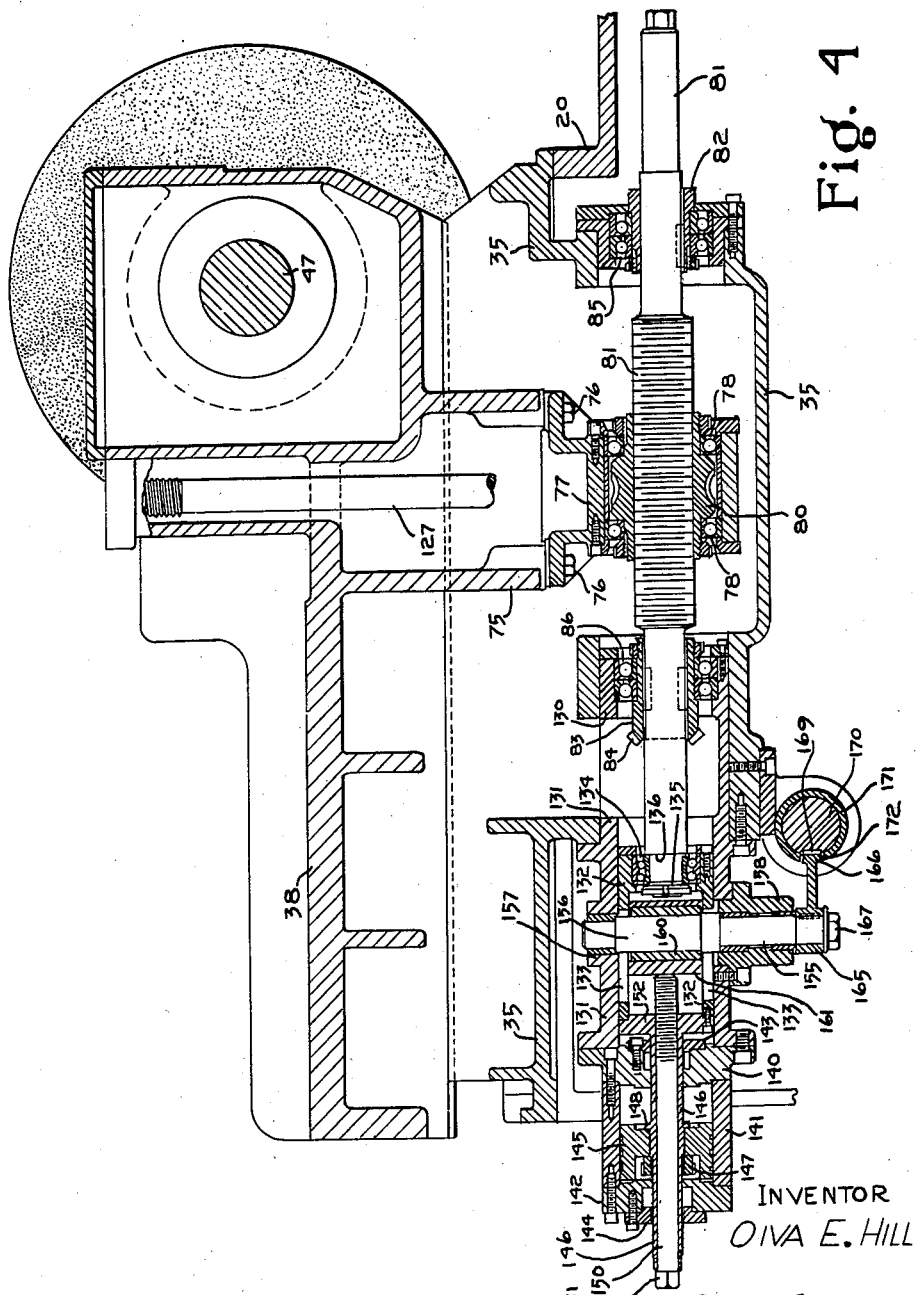

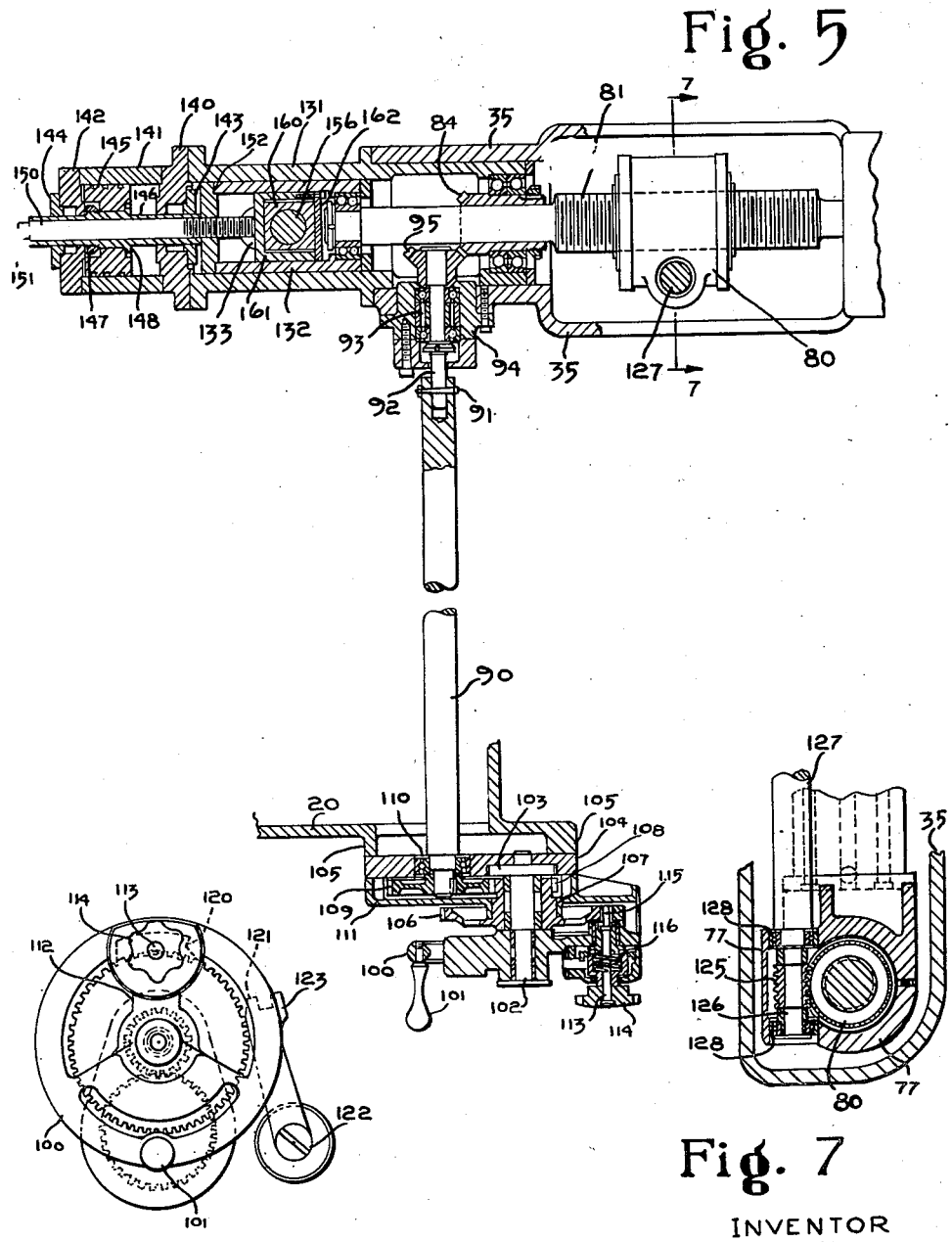

May 20, 1952 — O. E. HILL — 2,597,242
CENTERLESS GRINDING MACHINE
Filed April 15, 1949 — 16 Sheets-Sheet 6

INVENTOR
OIVA E. HILL
BY
ATTORNEY

May 20, 1952 O. E. HILL 2,597,242
CENTERLESS GRINDING MACHINE
Filed April 15, 1949 16 Sheets-Sheet 7

INVENTOR
OIVA E. HILL
By George Crompton
ATTORNEY

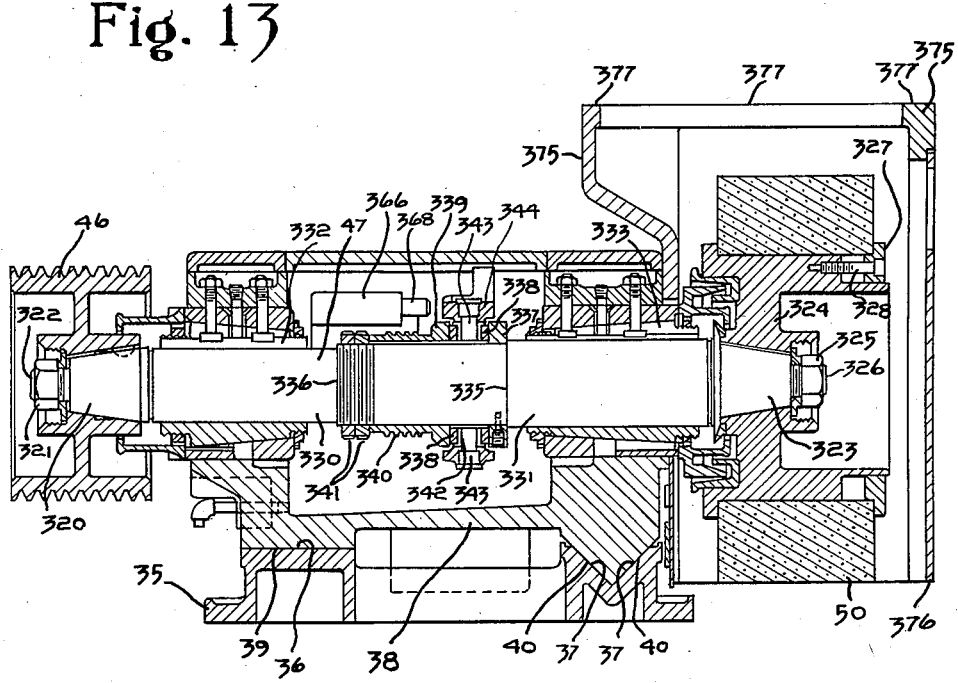
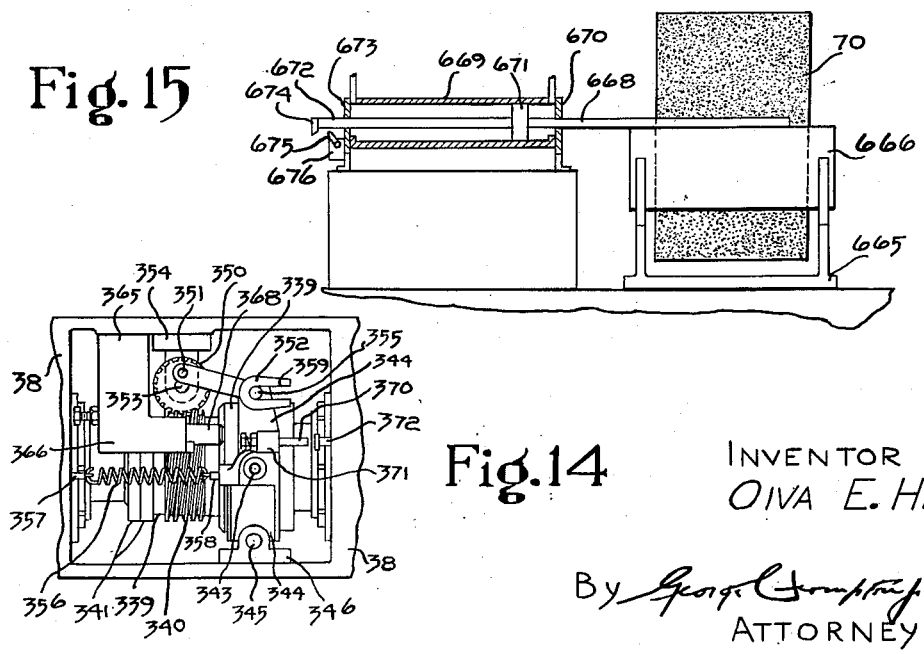

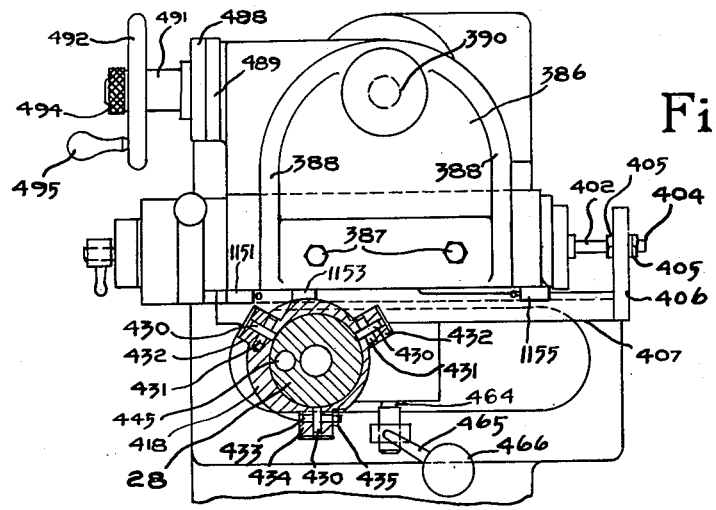
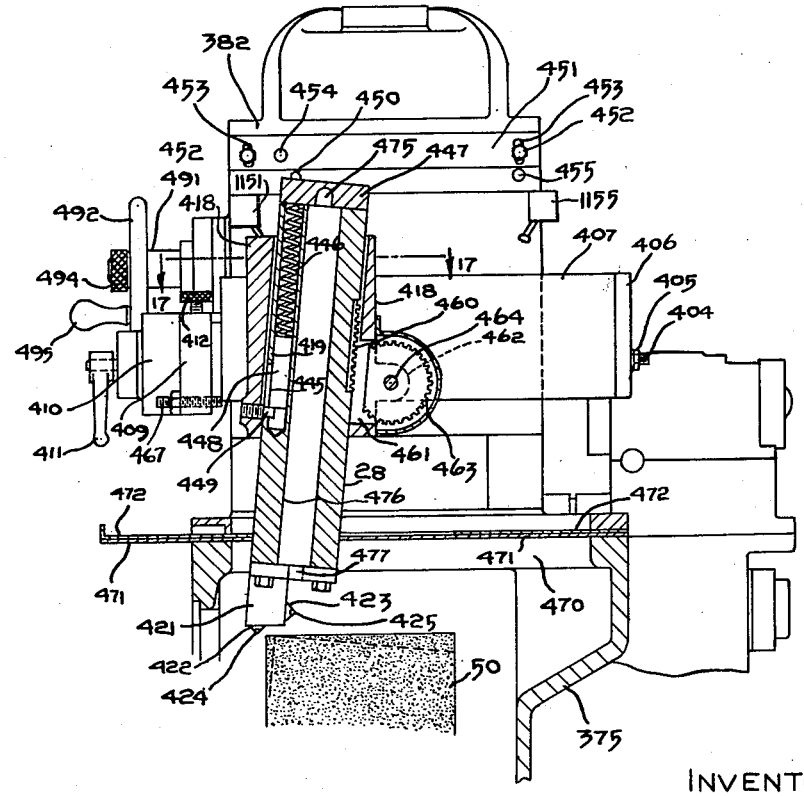
Fig. 17
Fig. 16

May 20, 1952     O. E. HILL     2,597,242
CENTERLESS GRINDING MACHINE
Filed April 15, 1949     16 Sheets-Sheet 11

INVENTOR
OIVA E. HILL
By George Crompton
ATTORNEY

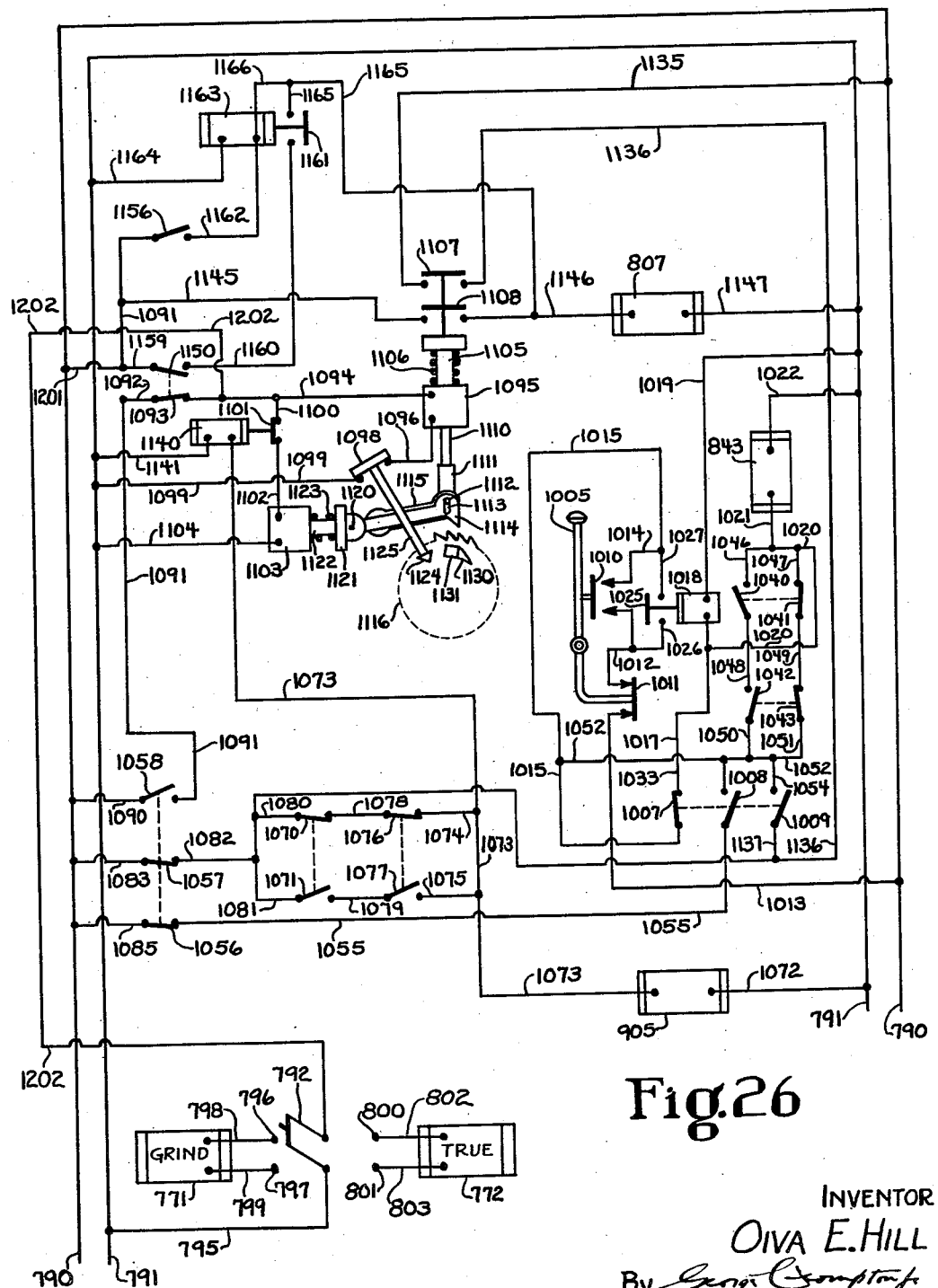

Patented May 20, 1952

2,597,242

UNITED STATES PATENT OFFICE 2,597,242

CENTERLESS GRINDING MACHINE

Oiva E. Hill, Worcester, Mass., assignor to Norton Company, Worcester, Mass., a corporation of Massachusetts Application April 15, 1949, Serial No. 87,720

35 Claims. (Cl. 51—103)

1

The invention relates to centerless grinders. This application is a continuation in part of my copending application Serial No. 45,388, filed August 20, 1948, and now abandoned.

One object of the invention is to provide a superior centerless grinder for grinding tapered workpieces. Another object of the invention is to provide a superior centerless grinder for grinding shouldered workpieces. Another object of the invention is to provide a superior centerless grinder which can be used for through feed grinding and for infeed grinding and which can be quickly converted from one to the other condition. Another object of the invention is to provide a centerless grinder for grinding shouldered work which is economical of the grinding wheel. Another object of the invention is to provide a centerless grinder particularly immune to vibration hence capable of producing not only accurate but also very regular and smooth workpieces. Another object of the invention is to provide a centerless grinder with compensating mechanism for resetting the machine after truing of the grinding wheel thus to avoid errors by failure to reset manually and to lighten the burden on the operator.

Another object of the invention is to provide a centerless grinder with all the adjustments commonly needed and so organized and arranged as to reduce difficulties in making relative adjustments. Another object of the invention is to provide a truly precision centerless grinder which is easy to operate and adjust. Another object of the invention is to provide a centerless grinder with a delicate infeed mechanism which slows down infeed as the work comes to size thereby enabling pieces to be ground to very close tolerances and giving smooth finishes. Another object of the invention is to provide a hydraulically actuated centerless grinder of one or more of the above characteristics.

Another object of the invention is to provide a simple and dependable drive for the regulating wheel capable of rotating the regulating wheel at a wide range of speeds for grinding at various work speeds and also for truing the regulating wheel. Another object of the invention is to provide a centerless grinder which changes the R. P. M. of the workpiece during a given grinding operation, this feature being either alone or in combination with slow down of the infeed during said grinding operation. Another object of the invention is to provide an infeed centerless grinder capable of reducing the work to the required tolerances and capable of giving

2 the work the required finish in a single operation by the machine or in a fewer number of operations by the machine. Another object of the invention is to provide a machine of the above character and having one or more of the above features which is rugged and highly dependable in practical operation. Another object of the invention is to provide a machine of the character indicated which can be embodied in an automatic, semi-automatic or manually operated machine.

Another object of the invention is to provide a centerless grinder which can be quickly changed over from a hand operated machine to a semi-automatic or automatic machine, that is to say to do infeed grinding by hand if desired, or to complete one grinding operation after the operator has started it, or to perform a selected number of infeed grinding operations followed by automatic truing and compensating followed by more grinding operations and so on, or to cause the wheel slide to move in and out to perform complete grinding operations continuously without interruption. Another object of the invention is to provide a dwell for sparking out if desired. Another object of the invention is to provide a centerless grinder for grinding shouldered work which is economical of the grinding wheel.

Other objects will be in part obvious or in part pointed out hereinafter.

The invention accordingly consists in the features of construction, combinations of elements, and arrangements of parts, all as will be exemplified in the structure to be hereinafter described, and the scope of the application of which will be indicated in the following claims.

In the accompanying drawings in which is shown one of various possible embodiments of the mechanical features of this invention, Figure 1 is a front elevation of a centerless grinder constructed according to the invention.

Figure 2 is an elevation of the left hand side of the grinder.

Figure 3 is an elevation of the right hand side of the grinder.

Figure 4 is a vertical sectional view of the feeding mechanism.

Figure 5 is a sectional view of the feeding mechanism, the upper portion of this figure showing a horizontal section, and the lower portion showing a vertical section.

Figure 6 is a front elevation of the handwheel and controls for adjusting the position of the grinding wheel.

Figure 7 is a vertical sectional view of the feed screw shaft showing a worm drive to rotate it when the compensating mechanism operates.

Figure 13 is a vertical axial sectional view of the grinding wheel spindle journals and reciprocator.

Figure 14 is a plan view of the spindle and reciprocator.

Figure 15 is a side elevation of the work rest and ejector.

Figure 16 is a vertical axial sectional view of the truing post of the truing mechanism for the grinding wheel and also showing the wheel guard in section and many parts in elevation.

Figure 17 is a horizontal sectional view of this truing post taken on the line 17—17 of Figure 16, and also showing many parts in plan.

Figure 26 is a wiring diagram similar to Figure 24 but illustrating said modification of the invention.

Figure 1:
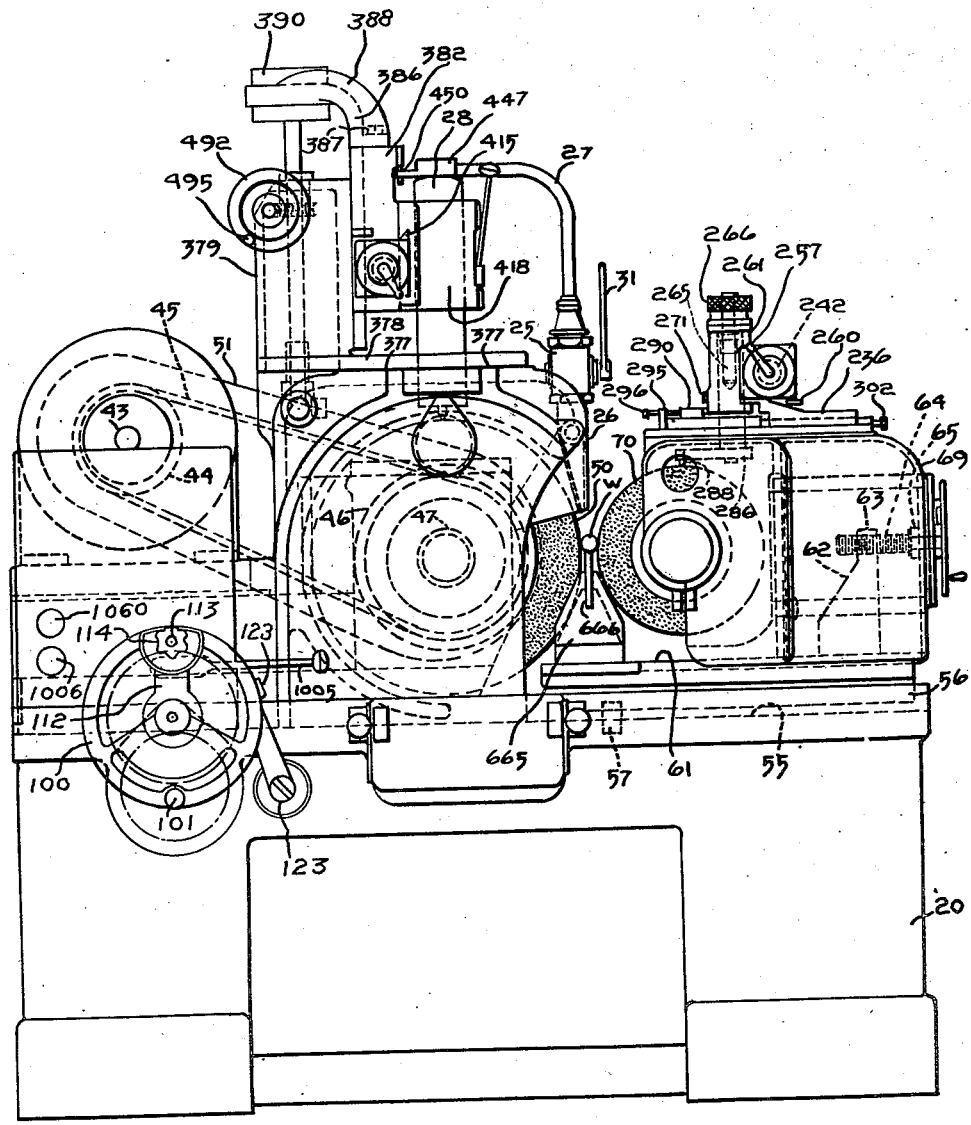
Figure 9:
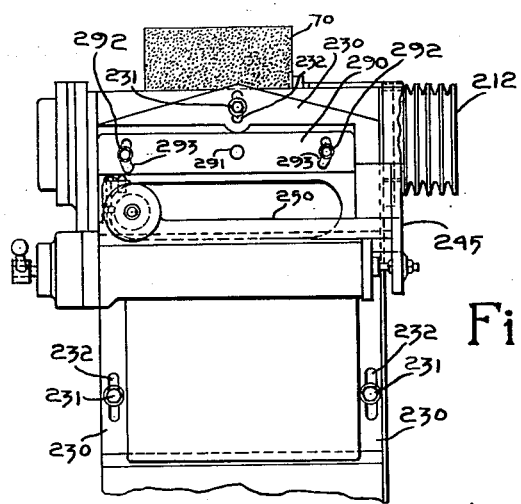
Figure 9 is a plan view of the truing mechanism for the regulating wheel.

Referring first to Figures 1, 2 and 3, the machine has a massive base 20 the inside of which is formed to provide a pair of tanks 21 and 22 respectively for hydraulic fluid (preferably oil) and coolant, which may be water with a grinding compound. If desired, apparatus for cooling and lubrication of grinding may be embodied in a system wherein one liquid is used for cooling and another liquid is used to lubricate the grinding action, these liquids being separately directed to the workpiece and the grinding wheel all in accordance with the disclosure of U. S. Letters Patent No. 2,434,679 to Wagner and Wickstrom. However in this embodiment only a single tank 22 and a single pump 23 for pumping liquid through a pipe 24 is illustrated. The pipe 24 goes to a selector valve 25 which is connected to a nozzle 26 to direct cooling and lubricating fluid onto the workpiece W and the valve 25 is also connected to a pipe 27 which leads to a truing tool post 28 whereby fluid can reach the grinding wheel 50 during truing thereof. The valve 25 is controlled by a handle 31 which can be used to shut off the valve or to direct the fluid into the nozzle 26 or to direct the fluid into the pipe 27.

Referring now to Figure 2, on top of the base 20 at the left hand side of the machine is rigidly secured a wheel slide base 35 having a flat way 36 and a V way 37. Upon these ways 36 and 37 is mounted a massive grinding wheel slide 38 having a flat way 39 to engage the flat way 36 and having a V way 40 to engage the V way 37. This wheel slide 38 can be moved either manually or automatically to the right or to the left as viewed from the front of the machine in a manner and by mechanism to be hereinafter described. Mounted upon the wheel slide 38 and adjustable in the same direction as the wheel slide moves is a motor table 41 to which is fastened a large electric motor 42 driving a shaft 43 upon which as better shown in Figure 1 is a multiple V pulley 44 driving V belts 45 which go to a pulley 46 on the spindle 47 to which is fastened the grinding wheel 50. The belts 45 are enclosed in a casing 51.

Figure 8:
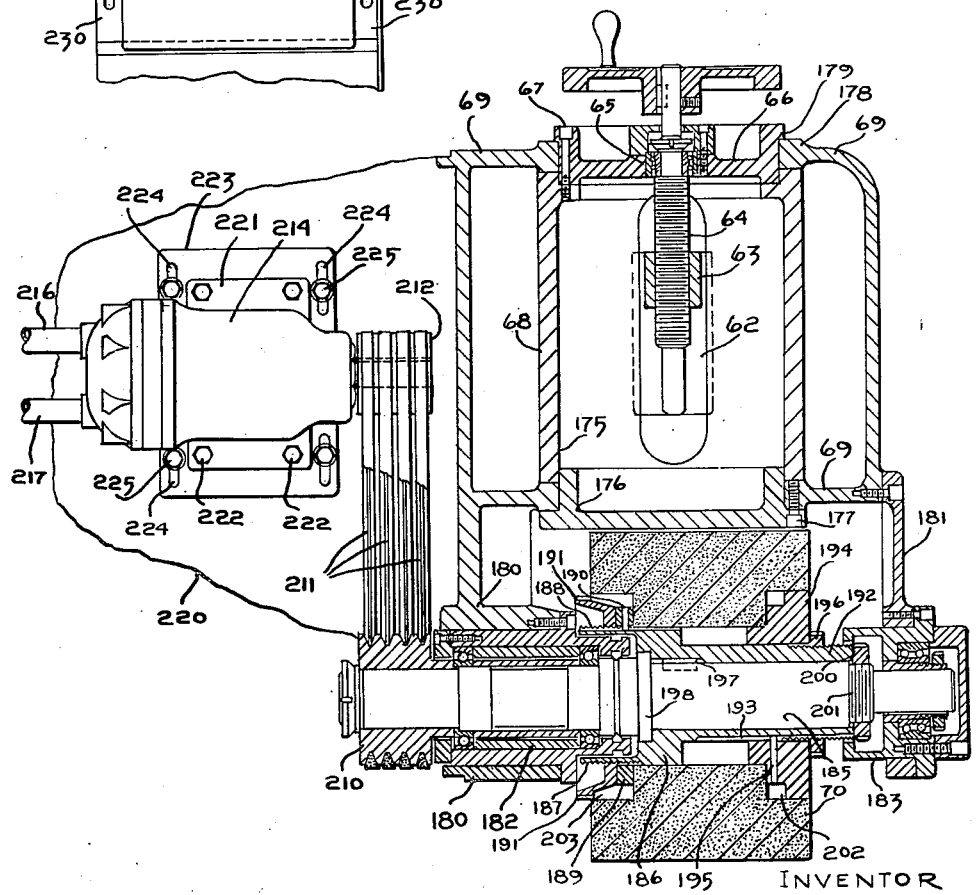
Figure 8 is a horizontal axial sectional view of the regulating wheel and housing therefor, the housing being adjustable to various skew angles, showing also a fluid motor and driving connections to rotate the regulating wheel at various speeds.

Referring now to Figure 3, on the right hand side of the machine which this figure illustrates the base 20 has a flat top 55 supporting a swivel table 56. Referring now to Figure 1, this swivel table 56 swivels on a pin 57 rigidly secured to the base 20. Referring again to Figure 3, the swivel table 56 has a dovetailed slideway 60 supporting a slide 61. Referring to Figures 1, 3 and 8, extending upwardly from the slide 61 is a standard 62 the upper end 63 of which is drilled and tapped to form a nut. Passing through the nut 63 is a screw shaft 64 which is journalled in thrust bearings 65 in a round plate 66 which is attached by means of bolts 67 to a large support 68 extending upwardly from and secured to the swivel table 56. This support 68 and also the plate 66 hold a regulating wheel housing 69 in any desired position of skew angle adjustment, the axis of adjustment being horizontal and parallel to the front of the machine. In the housing 69 and journalled on an axis perpendicular to the axis of skew adjustment is the regulating wheel 70. Any suitable means may be provided for securing the swivel table 56 to the flat top 55 after the desired angular adjustment has been made. For example, as shown in Figure 3, a plurality of bolts 71 may extend through the swivel table 56 into tapped holes in the flat top 55 of the base 20, these bolts 71 passing through arcuate slots, not shown, in the swivel table 56.

Referring now to Figure 4, depending from the wheel slide 38 is a nut support 75 having secured thereto by means of bolts 76 a nut housing 77. This nut housing 77 journals, by means of ball bearings 78, a combination nut and worm wheel 80 through which extends a screw shaft 81. The screw shaft 81 extends through and is keyed to a sleeve 82 at the right hand side, Figure 4, and extends through and is keyed to a sleeve 83 at the left hand side. The sleeve 83 has formed integrally therewith a bevel gear 84. The sleeve 82 is journalled in a ball bearing journal 85 which is supported by the wheel slide base 35 and likewise the sleeve 83 is journalled in a ball bearing journal 86 which is also supported by the wheel slide base 35. The screw shaft 81 is free to move axially in the sleeves 82 and 83 a limited distance.

Referring now to Figure 5, extending from the front wall of the base 20 to the wheel slide base 35 is a shaft 90. Pinned to this shaft 90 by means of a pin 91 is a short shaft 92 which is journalled in a ball bearing assembly 93 located in a housing 94 secured to the wheel slide base 35. To the far end of the short shaft 92 is secured a bevel gear 95 which meshes with the bevel gear 84. Thus whenever the shaft 90 is turned the screw shaft 81 is turned thereby moving the wheel slide 38.

Any suitable hand operated mechanism may be provided on the front of the machine for manually actuating the shaft 90. In Figures 5 and 6, I have shown a delicate manual actuator. A hand wheel 100 having a handle 101 is freely journalled on a stud 102 which has an integral disc portion 103 permitting it to be rigidly bolted to a plate 104 which is secured to pads 105 formed on the front of the base 20. Journalled on another portion of the stud 102 is a gear 106 which has a long hub 107 with a gear 108 smaller than the gear 106. The latter meshes with a gear 109 which is secured to the front end of the shaft 90. The shaft 90 is journalled in a ball bearing 110 mounted in the plate 104. A cover 111 secured to the plate 104 houses the gears 108, 109 and the ball bearing 110.

The hand wheel 100 has a spoke 112 in which is mounted a long pin 113 having fastened thereon at the front of the machine a knob 114 and having pinion gear teeth 115 out thereon at the other end. The pinion teeth 115 mesh with the gear 106. The pinion teeth 115 can, however, be pulled out of mesh with the gear 106 by pulling the knob 114. A spring 116 normally holds the pinion teeth 115 in engagement with the gear 106. This is a delicate feed mechanism whereby turning of the knob 114 will give slight increments of feed and it is also a fast operating hand feed mechanism operated by turning the hand wheel 100.

Referring to Figure 6, the hand wheel 100 has a stop 120 which will engage a stop arm 121 mounted on a pin 122 secured to the base 20. This stop arm 121 can be pulled out of the way by means of a finger portion 123 whenever desired. This combination of devices is useful for recording the previous position of the wheel slide as will be readily understood by those familiar with grinding machines generally.

Referring now to Figure 7, meshing with the worm wheel part of the nut and worm wheel 80 is a worm 125 secured to the reduced end portion 126 of a vertical shaft 127. This reduced end portion 126 is journalled in a pair of ball bearings 128 mounted in a portion of the nut housing 77. Whenever the shaft 127 is turned, the nut and worm wheel 80 is turned, but of course to a much less extent. This also adjusts the position of the wheel slide 38. The compensating mechanism for automatically turning the shaft 127 responsive to truing of the grinding wheel 30, will be later described.

Referring now to Figures 4 and 5, the ball bearing journal 86 includes a housing 130 which is a long sleeve extending to the left having a hollow cylindrical portion 131 integral with it. Slidable in the cylindrical portion 131 is a slotted sleeve 132 having slots 133 one hundred and eighty degrees apart. The right hand side of the sleeve 132 holds a ball thrust bearing 134. The left hand end of the screw shaft 81 has a cap 135 spaced from a shoulder 136, the ball thrust bearing 134 being secured between this cap and shoulder. Thus the screw shaft 81 is free to turn relative to the slotted sleeve 132 but rectilinear movement of the slotted sleeve 132 will move the screw shaft 81.

Secured to the left hand end of the hollow cylindrical portion 131 is a cylinder head 140 to which is secured a cylinder 141 to the other end of which is secured a cylinder head 142. Stuffing box plates 143 and 144 respectively in the heads 141 and 142 form stuffing boxes which will prevent escape of fluid from the cylinder 141. In the cylinder 141 is a piston 145 which is secured to a sleeve 146 by means of a nut 147 and a shoulder 148 on the sleeve 146. In the sleeve 146 is a shaft 150 threaded at the right end as shown and having a bolt head 151 at the other end. This shaft 150 is in threaded engagement with the sleeve 146 and it is also in threaded engagement with a head 152 secured to the left hand end of the slotted sleeve 132. By turning the shaft 150 these parts, namely the piston 145, the sleeve 146, the shaft 150, the head 152 and the slotted sleeve 132, can be securely locked together and also adjustment can be made of the distance by which the shaft 150 extends to the right of the head 152. In making this adjustment the sleeve 146 can be independently turned with a wrench and it desirable has some flat portions for this purpose.

Comparing now Figures 4 and 5, I provide a cross shaft 155 having an eccentric portion 156. The shaft 155 is journalled in an integral journal portion 157 formed in the hollow cylindrical portion 131 and in a journal box 158 secured to the hollow cylindrical portion 131. The eccentric portion 156 extends through a cylindrical hole in a guide block 160 which is slidable transversely (Figure 5) in a box 161 having a cylindrical outer surface that fits in the slotted sleeve 132. This box 161 has secured to the right hand side thereof, Figure 5, a cap 122 preventing the guide block 160 from moving in the box 161 in the direction of the axis of the shaft 150. The eccentricity of the portion 156 to the axis of the cross shaft 155 is very small (it may be about $\frac{3}{32}$ of an inch). It will now be seen that if fluid under pressure is introduced into the left hand side of the cylinder 141, the various parts including the screw shaft 81 will move to the right only as fast as permitted by rotation of the cross shaft 155 and eccentric portion 156. However, if a preliminary rapid infeed is wanted, the shaft 150 can be turned to move it to the left, whereupon the piston 145 can move to the right carrying with it the slotted sleeve 132 and the screw shaft 81 at a fast rate until the shaft 150 strikes the outside of the box 161, after which further movement to the right will be only as fast as permitted by rotation of the eccentric portion 156.

Referring now to Figure 4, secured to the lower end of the shaft 155 is the hub 165 of a gear segment 166, as by means of a nut 167. This gear segment 166 is in engagement with rack teeth 169 formed on a long piston 170 in a cylinder 171 which has a slot 172 therein to permit the teeth of the gear segment 166 to engage the rack teeth 169. Movement of the piston 170 in the cylinder 171 thus rotates the eccentric 156. Therefore by controlled flow of fluid to the cylinder 171, as hereinafter explained, the fine feed at the end of a grinding operation is controlled.

Referring now to Figure 8, the large support 68 has an interior cylindrical surface 175 in which fits the exterior cylindrical surface of a cap 176 which is secured by bolts 177 to a portion of the regulating wheel housing 69. The latter has an annular portion 178 which fits the outside of the round plate 66. It is thus that the housing 69 is mounted for adjustment about a horizontal axis on the support 68 and when the desired skew angle has been attained, the bolts 67 can be tightened squeezing the annular portion 178 between a lip 179 on the plate 66 and the end of the support 68 thus clamping the parts together.

The housing 69 has a journal supporting extension 180 on the rear side and fastened to it is a journal supporting plate 181 on the front side. The extension 180 supports a ball bearing journal assembly generally indicated by the numeral 182 while the supporting plate 181 supports a ball bearing journal assembly generally indicated by the numeral 183. These journals 182 and 183 rotatably support a spindle 185 upon which is mounted the regulating wheel 70.

A feature of the invention is that the regulating wheel 70 can be adjusted along the axis of the spindle 185. A sleeve 186 has an enlarged cup-shaped portion 187 which is threaded on the outside and also on the outside has a spline 188. A collar 189 is slidable over the threads and is keyed to the enlarged portion 187 by means of a pin 190 fitting in the spline 188. A cup-shaped nut 191 fits on the enlarged portion 187 and can be turned by means of a spanner wrench thus to adjust the position of the collar 189 and to tighten it against the regulating wheel 70.

The small end 192 of the sleeve 186 is threaded at the end and also has a spline 193. A large collar 194 is slidable on the small end 192 and has a pin 195 located in the spline 193. The large collar 194 may be adjusted and tightened by a nut 196 located on the threaded small end 192 of the sleeve 186.

The sleeve 186 fits the spindle 185 and is keyed thereto by means of a key 197. At one end of the sleeve 186 abuts a shoulder 198 of the spindle 185 and the other end of the sleeve 186 is held in place by a nut 200 located on the threaded portion 201 of the spindle 185. It will be seen that the large collar 194 fits the counterbore 202 of the regulating wheel 70 while the collar 189 is thrust against the inside flat face of the counterbore 203 of the regulating wheel 70. In this manner the regulating wheel 70 is securely held on the spindle 185 and it may readily be adjusted in position axially of the spindle 185.

A multiple V-pulley 210 is keyed to the spindle 185 and is connected by a plurality of belts 211 to a multiple V-pulley 212 on the shaft of a variable speed hydraulic motor 214. The construction of this motor will not be described herein because such construction forms no part of my invention and the motor can be procured on the market. The motor 214 however is connected to pipes 216 and 217 and by regulating the flow of fluid through these pipes 216 and 217 the speed of the motor can be varied within wide limits and it can also be reversed. The hydraulic system of my invention together with a variable speed reversible hydraulic motor is very advantageous for driving the regulating wheel of a centerless grinder. When a centerless grinder is grinding no actual power is required to rotate the regulating wheel, on the contrary what is really required is a brake. Nevertheless some means actually to rotate it is highly desirable to avoid starting inertia, so therefore some kind of a motor is indicated even though while grinding no actual power is required. On the other hand real power is required for truing and during the truing the regulating wheel should be rotated at a relatively high R. P. M. There should be many different low speeds for grinding and a high speed for truing. By using two fluid lines in parallel one having a throttle valve and the other having a check valve, I am able to provide a widely variable low speed drive for grinding with a high speed drive in reverse for truing.

The motor 214 is secured to a platform extension 220 of the regulating wheel housing 69 and so partakes of the skew adjustment of this housing. The casing of the motor 214 has a base plate 221 which is secured by bolts 222 to another plate 223 which has long slots 224 through which extend bolts 225 securing the plate 223 to the platform extension 220. By this construction the motor 214 may be readily moved to tighten the bolts 211.

Referring now to Figures 1, 3, 9, 10, 11 and 12, I provide fluid pressure actuated apparatus for truing the regulating wheel and for shaping it to the proper hyperboloidal shape or variation thereof to make line contact with work pieces when the regulating wheel is at a skew angle with the axis of the work piece W. Since the regulating wheel housing 69 can and will be secured to the swivel table 56 at various skew angles for various conditions of grinding, I make the truing apparatus adjustable to produce various hyperboloidal shapes. A plate 230 is secured by bolts 231 to the regulating wheel housing 69, the bolts 231 passing through slots 232 in the plate 230 in order to move the smallest diameter circle of the regulating wheel to either side of the center position axially to compensate for the position of the axis of the work piece above or below the plane of the axis of the grinding wheel and the center of the regulating wheel. Usually the work piece is slightly above this plane.

The plate 230 has a dovetail 235 which guides a slide 236 and having a dovetail recessed portion 237. The slide 236 further has flat portions 238 resting on the flat upper side of the plate 230. Thus the slide 236 can move parallel to the front of the machine and I can cause it to move at a constant speed by means of a straight truing cam bar as the truing diamond is moved, thereby to give the truing diamond a straight line skew movement to generate the desired hyperboloidal shape for the regulating wheel 70. On the other hand, by this mechanism I can form a more complicated shape of the regulating wheel by a curved cam bar which may be desired to produce more accurate results for grinding large work pieces.

Figures 10, 11, 12:
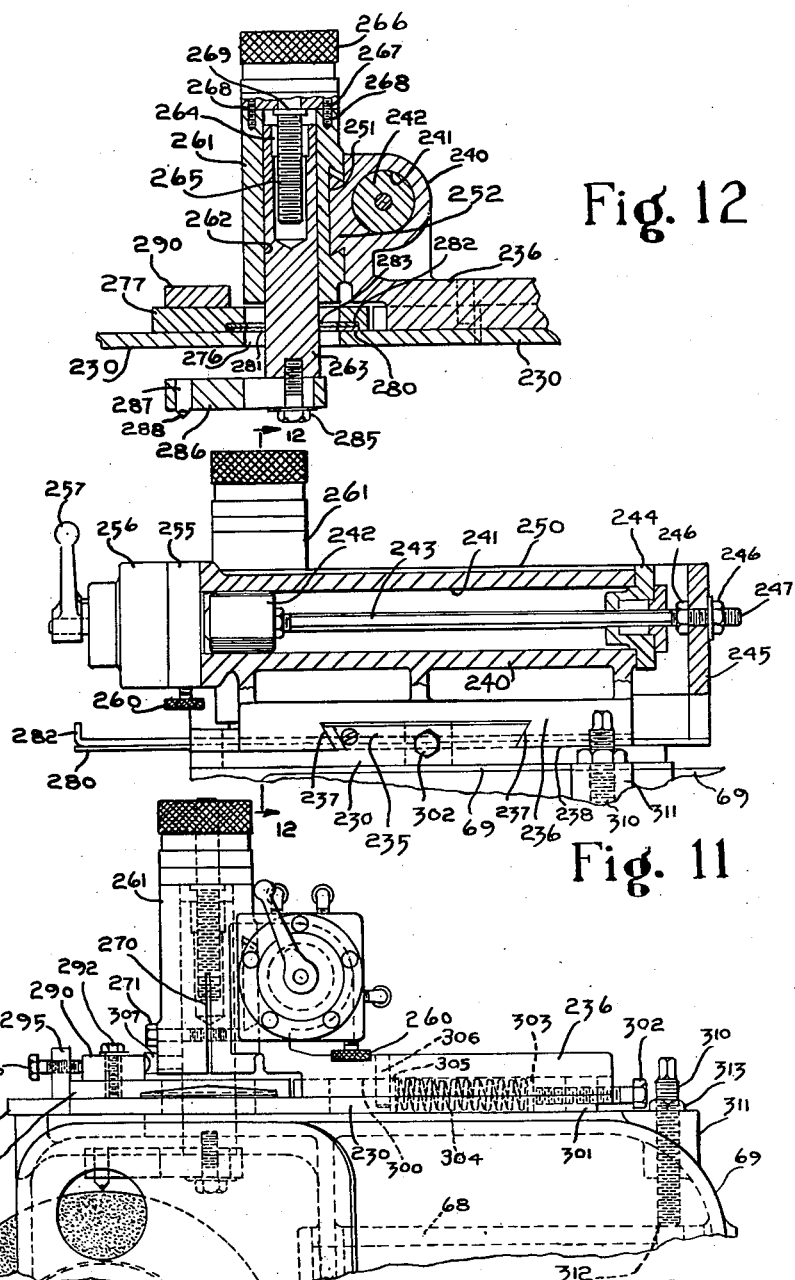
Figure 10 is a front elevation of the truing mechanism for the regulating wheel.
Figure 11 is a vertical sectional view of the truing mechanism for the regulating wheel.
Figure 12 is a vertical axial sectional view of the truing post mounting of the truing mechanism for the regulating wheel.

Referring now to Figures 11 and 12, the slide 236 has an upstanding portion 240 which is bored and ground to form a cylinder 241 in which fits a piston 242 that is slidable in the cylinder 241. This piston 242 has a piston rod 243 that extends through a cylinder head 244 and is secured to an arm 245 by means of nuts 246 on a threaded end 247. The arm 245 is fastened to a slide 250 which has a long dovetail recess 251 fitting over a dovetail 252 formed on the side of the upstanding portion 240. The slide 250 is thus moved perpendicularly to the front of the machine by movement of the piston 242 within the cylinder 241.

On the front end of the upstanding portion 240 is a head 255 to the cylinder 241 to which is attached a valve casing 256 having an operating handle 257 for causing the piston 242 to move rearwardly and forwardly as desired. Extending into the cylinder head 255 which has ports and channels is an adjustable needle valve 260 by means of which the speed of the piston 242 may be regulated.

The slide 250 has integrally formed therewith a vertical truing post 261 which has a cylindrical inner surface 262 in which fits a movable tool post 263. This post 263 has secured therein a nut 264 through which extends a screw 265 secured to a knurled wheel 266, the screw 265 being journalled in a cap 267 secured to the truing post 261 by means of screws 268. The screw 265 has a collar portion 269 under the cap 267 and the knurled wheel 266 contacts the upper side of the cap 267 and these parts constitute thrust bearings to hold the screw 265 in position. The truing post 261 is partly split in front with a slot 270 and when the desired adjustment of the tool post 263 has been made, the post 263 is rigidly clamped in the post 261 by tightening a bolt 271 that extends across the slot 270 into a threaded hole in the post 261 beyond the slot 270.

A long and fairly wide slot 276 is formed in the plate 230. I provide a guard holding plate 277 having a slot 278 of the same size and shape as the slot 276. The movable tool post 263 extends through these slots 276 and 278 and therefore can be moved fore and aft of the grinder as well as sideways for a limited distance. I provide a bottom guard plate 280 which rides on the plate 230 and is held in position by the guard holding plate 277 and which has a slot 281 just wide enough in the fore and aft direction to permit passage of the tool post 263. This guard plate 280 is also preferably fastened to the arm 245. I provide an upper guard plate 282 which has a slot 283 that is as wide laterally as the slot 281 and also extends for a considerable distance in a fore and aft direction. These guard plates 280 and 282 are splash protectors but do not interfere with movement of the tool post 263.

Secured to the lower end of the tool post 263 as by means of a bolt 285 is a diamond holding arm 286 in which is secured a nib 287 having a diamond 288 for truing the wheel 70.

The skew bar 290 is pivotally mounted in a pin 291 and may be secured in any desired position of adjustment by means of bolts 292 extending through slots 293 in the skew bar 290. The bolts 292 extend into threaded holes in the guard holding plate 277 and the pin 291 extends upwardly from this guard holding plate. I provide a lug 295 fastened to the guard plate 277 and through the lug 295 extends a screw 296 engageable with the front end of the skew bar 290 and by means of which fine adjustment of skew may be made. After they are made, however, the bolts 292 should be tightened to hold the adjustment.

The dovetail 235 has a rectangular slot 300 extending from top to bottom of it and of the plate 230 leaving however a solid portion 301 at the right hand end, Figure 10. A screw 302 extends through and is in threaded engagement with this portion 301. At the left hand end of the screw 302 is a small plate 303 fitting in the slot 300 and to the left of the plate 303 is a spring 304 also fitting in the slot 300 and to the left of the spring 304 is a small plate 305 also fitting in the slot 300 and the plate 305 abuts a pin 306 extending downwardly from the slide 236. Thus the slide 236 is at all times urged to the left with respect to the housing 69 and the tension can be varied by setting the screw 302. A follower 307 secured to the truing post 261 is thereby held in engagement with the skew bar 290. The mechanism above described provides means for truing the regulating wheel 70 to a right circular cylinder if desired and also to various hyperboloidal shapes with the small diameter at any place from end to end of the regulating wheel and even to other related shapes which have no geometrical name. The latter is possible if the skew bar 290 has a curved right hand surface instead of a straight one as will usually be the case.

To facilitate adjustment of the housing 69 to various skew angles I provide a screw 310 passing through a threaded boss 311 formed on the housing 69 and engaging a surface 312 on a part of the large support 68 which is well offset from the axis of the cylindrical surface 175. When the adjustment has been made a nut 313 can be tightened and the bolts 67 can also be tightened to hold the adjustment.

Referring now to Figure 13, the grinding wheel spindle 47 has a tapered rear end 320 to which is keyed the pulley 46 which is fastened in place by means of a nut 321 on a threaded end portion 322 of the spindle 47. The grinding wheel spindle 47 also has a tapered front end 323 to which is keyed a hub 324 mounting the grinding wheel 50. The wheel hub 324 is likewise secured in place by means of a nut 325 on a threaded end portion 326 of the spindle 47. The grinding wheel 50 is clamped to the hub 324 by means of a ring 327 through which extend bolts 328 screwed into the hub 324. The spindle 47 has bearing portions 330 and 331 which are supported in journals 332 and 333 whereby the spindle 47 can rotate freely and truly. The journals 332 and 333 are supported by the wheel slide 38.

I provide wheel spindle reciprocating mechanism in order to reciprocate the spindle 47 in its journals 332 and 333. When doing certain kinds of infeed grinding, it is highly desirable that the grinding wheel shall reciprocate slightly in order to break up the grinding lines. However, the spindle should not be reciprocating when the wheel 50 is being trued. I provide hydraulic mechanism which automatically stops the reciprocating of the spindle 47 whenever the slide 38 is out. For through feed grinding and for certain types of infeed grinding, the spindle 47 should not reciprocate at all. I further provide means to stop the spindle 47 from reciprocating at the will of the operator.

Referring now to Figures 13 and 14, the spindle 47 has a shoulder 335 and it has a threaded portion 336. A plain collar 337 is on the spindle 47 against the shoulder 335. A ring 338 is mounted between the collar 337 and a sleeve 339 which has a worm thread 340. The left hand end of the sleeve 339 abuts one of a pair of nuts 341 on the threaded portion 336. A pair of sleeves 342 are located in holes in the ring 338, and in the sleeves 342 are pins 343. The pins 343 are carried by a yoke 344 which is pivotally mounted on a pin 345 extending between the legs of a U-shaped bracket 346 which is secured to the interior of the wheel slide 38.

A worm wheel 350 meshes with the worm threads 340 and rotates an eccentric pin 351 upon which is mounted a forked link 352. The worm wheel 350 has a trunnion pin 353 which is held by a bracket 354 secured to the inside of the slide 38. The yoke 344 has a pin 355 fitting in the forked end of the link 352. A pull string 356 hooked to a post 357 attached to the slide 38 and hooked to a post 358 attached to the yoke 344 pulls the yoke 344 to keep the pin 355 at the end of the slot 359 of the forked end of the forked link 352. It will now be seen that normally the spindle 47 is reciprocated by the oscillating yoke 344 acting through the pins 343 in sleeves 342 which are held by the ring 338. However, if and when the yoke 344 is pushed and held to the right (Figure 13) the spindle 47 will be held stationary since the forked link 352 will oscillate without effect.

In order to make the reciprocating mechanism inoperative, I provide a bracket 365 secured to the inside of the wheel slide 38, the bracket having an integral cylinder 366 (see now Figure 22) in which is a piston 367 having a piston rod 368. A spring 369 tends to push the piston 367 to one end of the cylinder 366 but when pressure is exerted in the cylinder 366, the spring 369 is compressed and the piston rod 368 moves outwardly. Referring again to Figures 13 and 14, the piston rod 368 can engage the yoke 344 and move it to cause an adjustable stud 370 projecting through a threaded boss 371 on the yoke 344 to engage a headed stud 372 secured to the inside of the slide 38. Therefore, whenever fluid under pressure is caused to flow into the cylinder 366, the spindle reciprocating mechanism is put out of action, but at other times it is operating.

Referring now to Figure 13, surrounding the grinding wheel 50 is a massive wheel guard 375 having a removable front plate 376. This wheel guard 375 has a horizontal machined surface 377 to which the wheel truing apparatus now to be described is attached.

Figures 18, 19:
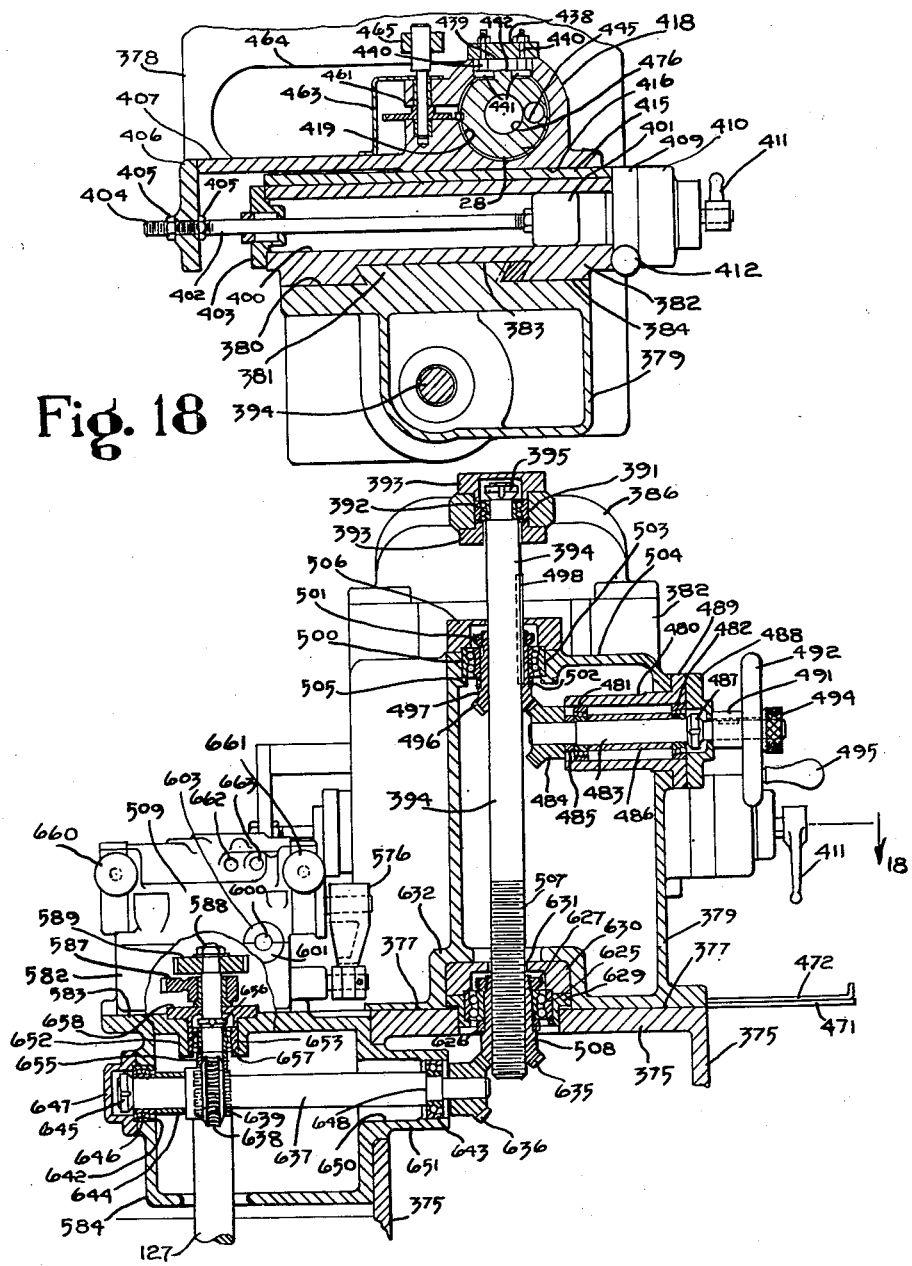
Figure 18 is a horizontal sectional view of the cylinder and through the truing post of the truing mechanism for the grinding wheel.
Figure 19 is a vertical sectional view of the mechanism for moving the truing post and for compensating feeding of the grinding wheel.

Referring now to Figure 1, the grinding wheel truing apparatus has a base plate 378 which is secured to the surface 377. Extending upwardly from this base plate 378 is a column 379. Referring now to Figure 18, this column 379 has a vertical flat surface 380 and projecting from the surface 380 is an integral dovetail 381. A slide 382 having a dovetail recess 383 is mounted on the column 379 and held in position by the dovetail 381 fitting in the recess 383 and by a flat surface 384 on the slide 382 fitting against the flat surface 380 of the column 379.

Referring now to Figure 1, secured to the top of the slide 382 is an overarm 386 as by means of bolts 387 shown in Figure 17. As shown in this figure this overarm 386 is wide and has ribs 388 to give it strength. At the outer end of the overarm 386 is a thrust bearing assembly 390. As shown in Figure 19 this may comprise a ball bearing assembly 391 held in a cylindrical hole 392 in the overarm 386 by means of a pair of ball bearing retaining rings 393, the inner race of the ball bearing being held to the end of a vertical shaft 394 by means of a nut 395. Thus the shaft 394 controls the position of the slide 382 and apparatus to move and position the shaft 394 will hereinafter be described.

Referring now to Figure 18, the slide 382 is bored and ground to provide an internal cylinder 400. In this cylinder 400 is a piston 401 having a piston rod 402 which extends through a cylinder head 403. The piston rod 402 has a threaded end 404 upon which are nuts 405 attaching it to an arm 406 extending from the rear end of a horizontally movable slide 407. At the front end of the cylinder 400 is a cylinder head 409 outside of which is secured a valve casing 410 having a valve handle 411. The head 409 is similar to the head 255 for the cylinder 241, the valve casing 410 is the same as the valve casing 256, and the operating handle 411 causes the piston 401 to move rearwardly and forwardly as desired. Extending into the cylinder head 409 which has ports and channels is an adjustable needle valve 412 by means of which the speed of the piston 401 may be regulated.

Referring to Figures 1 and 18, the slide 382 has a dovetail 415 which fits in a dovetail recess 416 in the slide 407. Thus the slide 407 is supported by the slide 382 for horizontal movement of the slide 407 responsive to movement of the piston 401 in the cylinder 400.

Referring now to Figures 1, 16, 17 and 18, the slide 407 has on the right hand side thereof an integral massive portion 418 which is shaped somewhat like a cylinder. This portion 418 has extending from top to bottom a bore 419 which has an axis that is in a vertical plane perpendicular to the front of the machine but is inclined in that plane about 5° from the vertical. Located in the bore 419 is the truing tool post 28 to the lower end of which is rigidly attached a diamond holder 421 having a pair of nibs 422 and 423 containing truing diamonds 424 and 425. The diamond 424 is for truing the periphery of the wheel 50 while the diamond 425 is for truing the face of the wheel 50.

The truing tool post 28 is stationary in the bore 419 when the diamond 422 is making a cut on the wheel 50 parallel to the axis of the wheel 50, but when truing a tapered surface on the wheel 50 the tool post 28 moves in the bore 419 and also when the diamond 425 is cutting the face of the wheel 50 the tool post 28 is moved in the bore 419. I provide a mounting for the tool post 28 in the bore 419 permitting such movement without any side play and at other times holding the tool post stationary without any side or end play and at all times preventing the post 28 from turning in the bore 419.

Referring now to Figure 17, I provide near the top of the massive portion 418 three rollers 430, two of them mounted on pins 431 in holes through bosses 432 on the portion 418 and the third roller 430 being mounted on an eccentric pin 433 in a similar boss 434. These rollers 430 guide the post 28 and by turning the eccentric pin 433 and tightening it with a nut 435, all the play can be removed from the mounting. The guiding means just described is located near the top of the portion 418 and another guiding means of the same construction is provided near the bottom of the portion 418 but since this is a duplicate it is not shown.

Referring now to Figure 18, between the foregoing guiding means I provide still another guiding means to prevent twisting of the tool post 28 in the bore 419. This comprises a plate 438 secured to the portion 418 over a cut-out 439 therein, the plate 438 supporting a pair of studs 440 upon the end of which are rollers 441. These rollers 441 engage a rib 442 formed by milling secant planes in the cylindrical surface of the tool post 28.

Referring to Figure 17, I provide an off center bore 445 in the post 28 parallel to the axis of the post. Referring to Figure 16, in this bore 445 is a spring 446 one end of which abuts a cap 447 on the top of the post 28 and the other end of which abuts plunger 448 in the bore 445. The plunger 448 contacts a stationary pin 449 secured to the portion 418 and projecting into the bore 445. By this means the truing tool post 28 is urged upwardly to hold a follower 450 in contact with a cam 451. The follower 450 is mounted on a portion of the cap 447. The cam bar 451 is attached by bolts 452 to the slide 382. The bolts 452 extend through slots 453 in the cam bar 451. The cam bar 451 is also mounted on a pivot pin 454 projecting from the slide 382. By loosening the bolts 452 the cam bar 451 may be adjusted on the pivot pin 454 and then the bolts 452 are retightened. From the position of the pin 454 relative to the bolts it will be seen that the right hand end of the cam bar 451 will move considerably further than the left hand end when it is adjusted, so I provide an extra threaded hole 455 into which to place the right hand bolt 452 when the cam bar 451 is adjusted to a 5° angle. It will be seen that when the cam bar 451, that is to say its lower straight edge, is placed parallel with the axis of the grinding wheel 50, the periphery of the wheel 50 may be trued to a true cylinder but if it is desired to taper the wheel 50 this may be done by inclining the cam bar 451 to the axis of the wheel 50.

A particular feature of this invention resides in the combination of the swivel table 56 for the regulating wheel 70 and this apparatus for truing the grinding wheel 50. If shoulder grinding is to be done it is necessary to true not only the periphery of the wheel but also one face thereof. In the grinding of hundreds or thousands of work pieces the grinding wheel will necessarily have to be trued a good deal. With ordinary straight truing devices to true a cylindrical surface upon the grinding wheel and also a plane face, such repeated truing quickly reduces not only the diameter but also the width of the wheel. By providing for angle truing of the grinding wheel thus giving it a conical periphery and a conical face, repeated truing does not increasingly diminish the width of the wheel. Such a grinding wheel can grind a cylindrical surface on a work piece if the regulating wheel is moved to bring the axis of the regulating wheel parallel to an element of the peripheral conical surface of the grinding wheel rather than parallel to the axis thereof. This invention provides for this combination of features thus permitting shoulder grinding without excessive waste of the grinding wheel from cutting. Furthermore by using a tapered grinding wheel I find an improved finish on the work piece is achieved. The angle of 5° for this tapered truing herewith illustrated is merely one selected angle and other angles can be used but an angle of about 5° is thoroughly satisfactory from all points of view. The means for moving the tool post 28 downwardly at the 5° angle will now be described.

Referring now to Figure 16, the rear side of the post 28 has rack teeth 460 cut therein. The rear side of the portion 418 has a long slot 461 cut through to the bore 419. The rear side of the portion 418 has a boss 462 through which the slot 461 also extends. Referring now to Figures 16 and 18, a mutilated gear 463 is secured to a shaft 464 extending through the boss 462. Normally the teeth of the mutilated gear 463 do not engage the rack teeth 460 but when this gear 463 is turned as by means of a hand lever 465 secured to the shaft 464 and having a knob 466 (Figure 17), the teeth of the gear 463 engage the rack teeth 460 and move the tool post 28 downwardly. This is done by the operator whenever he wishes to true the front face of the grinding wheel 50. I provide a stop screw 467 extending through the head 409 which is engaged by part of the portion 418 so as to locate the slide 407 in a fixed although adjustable position every time it is desired to true the front face of the grinding wheel 50. From this description it will be seen that the grinding wheel can be used until its diameter is no longer sufficient but repeated truings of the face for shoulder grinding will not cause it to get thinner and thinner.

The tool post 28 extends through a slot 470 in the wheel guard 375. In order to keep the coolant fluid from splashing upwardly from the grinding wheel 50 and wetting the machine generally, I provide a pair of guard plates 471 and 472 which are constructed and function the same as the guard plates 280 and 282. Water or other coolant for the grinding wheel 50 is delivered when truing by the hose pipe 27 as already stated. The upper end of the hose pipe 27 is connected to the cap 447 which has a channel 475 part of which is shown in Figure 16. The channel 475 opens into a bore 476 in the tool post 28 and the lower end of the bore 476 communicates with a hole 477 through the diamond holder 421 and thus water or other fluid may be directed to the grinding wheel 50 practically at the spot where either the diamond 424 or the diamond 425 is truing the wheel.

Referring now to Figure 19, it will be remembered that the slide 382 is held or moved for adjustment purposes by means of the shaft 394. I provide means for manually adjusting the level of the top of this shaft 394 vertically and I further provide automatic compensating mechanism for adjusting it downwardly each time the periphery of the grinding wheel 50 is trued. As shown in Figure 19, a sleeve 480 is secured to the column 379 and in this sleeve 480 are ball bearings 481 and 482, the inner races of which are fitted onto a shaft 483 to which is fastened a bevel gear 484. The right hand end of the hub of the bevel gear 484 abuts a small collar 485 which abuts the inner race of the ball bearing 481, which abuts a long sleeve 486 on the shaft 483, which long sleeve 486 abuts the inner race of the ball bearing 482 which inner race abuts a tightening nut 487 on the shaft 483. The outer race of the ball bearings 482 is held in the sleeve 480 by means of a cover plate 488 secured to a flange 489 on the sleeve 480. The shaft 483 extends through a hole in the cover plate 488 and has thereon outside of this cover plate a sleeve 491. Beyond the sleeve 491 and tightly secured to the shaft 483 is a hand wheel 492. The outside end of the shaft 483 is threaded and has located thereon a knurled nut 494. Whenever the knurled nut 494 is tightened, the hand wheel 492 is rigidly held between the nut 494 and the sleeve 491 which abuts the cover plate 488. In this manner, the shaft 483 and the bevel gear 484 mounted thereon can be held fast. However, when the knurled nut 494 is loosened, the hand wheel 492 can readily be turned thus turning the bevel gear 484. I provide a handle 495 on the hand wheel 492 for convenience in making the adjustment.

The bevel gear 484 meshes with a bevel gear 496 which has integral therewith a long hub sleeve 497 having a spline and connected by a long key 498 to the shaft 394. The shaft 394 is thus free to move up and down in the sleeve 497, but whenever the bevel gear 496 is turned, the shaft 394 is turned. The long hub sleeve 497 is secured to the inner race of a ball bearing 500 by means of a nut 501 on the sleeve 497 on one side of the inner race of the ball bearing 500 and by means also of a collar 502 on the other side of the inner race of the ball bearing 500. The outer race of the ball bearing 500 is seated in a cylindrical bore 503 in the upper wall 504 of the column 379 and is held between a seat 505 integral with the wall 504 and a cap 506 secured to the upper side of the wall 504. The shaft 394 has a screw threaded portion 507 in a sleeve nut 508. Whenever the shaft 394 is turned by rotation of the hand wheel 492, the shaft 394 and therefore the slide 382 will be raised or lowered and similarly whenever the nut 508 is turned.

Figure 21:
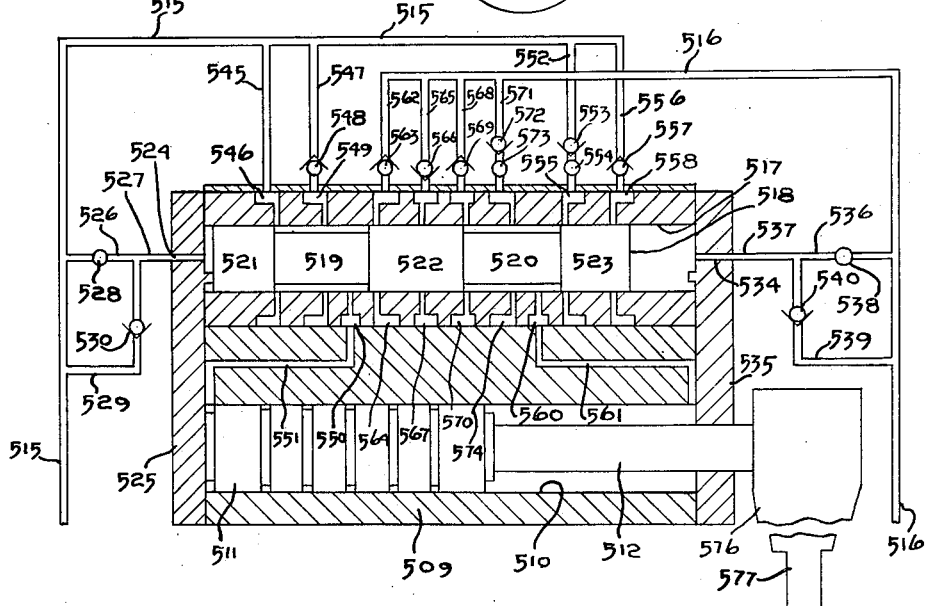
Figure 21 is a sectional view of the piston-cylinder and valve mechanism of the compensator drive.

A hydraulically operated mechanism is provided automatically to compensate for truing, that is to move the slide 382 downwardly by turning the nut 508 and to move the grinding wheel slide 38 towards the regulating wheel 70 by turning the nut 80 before the diamond 424 starts to cut the grinding wheel 50. Referring now to Figure 21, I provide a casing 509 having a cylinder bore 510 having a piston 511 having a piston rod 512. The operator turns the handle 411 to initiate a truing stroke and this, in a manner to be hereinafter described, causes fluid under pressure to enter one of two pipes 515 or 516 and connects the other one to exhaust. The casing 509 has another cylinder bore 517 in which is a valve piston 518 having two long grooves 519 and 520 bounded by full sized port blocking portions 521, 522 and 523. The pipe 515 is connected to a port 524 in a cylinder head plate 525 by means of pipes 526 and 527, the pipe 526 having a throttle valve 528 therein, and the pipe 515 is also connected to the port 524 by means of a pipe 529 and the pipe 527, the pipe 529 having a ball check valve 530 therein. The port 24 admits fluid to or discharges it from the left hand end of the cylinder bore 517.

Similarly, the pipe 516 is connected to a port 534 in a cylinder head plate 535 by means of pipes 536 and 537, the pipe 536 having a throttle valve 538 therein, and the pipe 516 is also connected to the port 534 by means of a pipe 539 and the pipe 537, the pipe 539 having a ball check valve 540 therein. The port 534 admits fluid to or discharges it from the right hand end of the cylinder bore 517.

Now when the pipe 515 is connected to pressure and the pipe 516 is connected to exhaust, the valve piston 518 is moved to the right, fluid entering the left hand end of the bore 517 via the pipe 529, ball check valve 530, pipe 527 and port 524, and fluid exhausting from the bore 517 via the port 534, pipe 537, pipe 536 and throttle valve 538. The valve piston 518 moves a full stroke to the right and at a speed determined by the setting of the throttle valve 538. When on the other hand the pipe 516 is connected to pressure and the pipe 515 is connected to exhaust, the valve piston 518 is moved to the left, fluid entering the right hand end of the bore 517 via the pipe 539, ball check valve 540, pipe 537 and port 534, and fluid exhausting from the bore 517 via the port 524, pipe 527, pipe 526 and the throttle valve 528. The valve piston 518 moves a full stroke to the left and at a speed determined by the setting of the throttle valve 528.

Whenever the valve piston makes such complete stroke, be it to the right or to the left, the piston 511 makes a complete reciprocation, i. e. a double stroke, but the amplitude of such double stroke is controllable by the speed of the valve piston 518 and otherwise, and this variable amplitude produces a variable compensation.

Referring to Figure 21, to explain how the single stroke of the valve piston 518 produces a double stroke of the actuating piston 511 and how the amplitude of the double stroke of the piston 511 is regulated, I shall first identify the several pipes, valves, ports and passages and then describe the action. The pipe 515 is connected by a pipe 545 to a port 546. The pipe 515 is connected by a pipe 547 having a ball check valve 548 to a port 549. A port 550 is connected by a passage 551 to the left hand end of the cylinder bore 510. The pipe 515 is also connected by a pipe 52 having a ball check valve 553 and a throttle valve 554 to a port 555 and by a pipe 556 having a ball check valve 557 to a port 558. A port 560 is connected by a passage 561 to the right hand end of the cylinder bore 510. The pipe 516 is connected by a pipe 562 having a ball check valve 563 to a port 564. The pipe 516 is further connected by a pipe 565 having a ball check valve 566 to a port 567. The pipe 516 is further connected by a pipe 568 having a ball check valve 569 to a port 570. The pipe 516 is further connected by a pipe 571 having a ball check valve 572 and a throttle valve 573 to a port 574.

Assume now that the pipe 515 is connected to pressure and the pipe 516 is connected to exhaust. The port 546 is therefore under pressure and fluid flows via the groove 519 to the port 550 and through the passage 551 to the left hand end of the cylinder bore 510 therefore starting the piston 511 to the right. At that time fluid can exhaust from the right hand end of the bore 510 by way of the passage 561 port 560 groove 520 port 574 pipe 571 throttle valve 573 check valve 572 to the pipe 516. When the valve piston 518 has moved slightly to the right, the exhaust passages are the same but the fluid now flows to the left hand end of the bore 510 via the pipe 547 ball check valve 548 port 549 groove 519 port 550 and passage 551. The speed of the piston 511 is during practically the entire stroke of the valve piston 518 controlled by the setting of the throttle valve 573. Ultimately the valve piston 518 reaches the right hand end of its stroke and now fluid flows from the pipe 515 through the pipe 556 and the ball check valve 557 into the port 558 and along the groove 520 into the port 560 and through the passage 561 to the right hand end of the bore 510 thus returning the piston 511 and the fluid from the left hand end of the bore 510 at this time exhausts through the passage 551 the port 550 the groove 519 the port 567 the pipe 565 and the ball check valve 566 into the pipe 516.

Assume now that the pipe 516 is connected to pressure, the pipe 515 is connected to exhaust and the valve piston 518 is at the right hand end of its stroke. Fluid now flows from the pipe 516 through the pipe 562 and the ball check valve 563 into the port 564 and along the groove 519 to the port 550 and through the passage 551 to the left hand end of the bore 510. At this time fluid exhausts from the right hand end of the bore 510 via the pasage 561 the port 560 the groove 520 the port 555 the pipe 552 the throttle valve 554 and the check valve 553 to the pipe 515. The piston 511 therefore starts moving to the right and at a rate controlled by the throttle valve 554. This condition continues until the valve piston practically reaches the end of its stroke to the left whereupon fluid flows from the pipe 516 via the pipe 568 ball check valve 569 port 570 groove 520 port 560 passage 561 to the right hand end of the bore 510 and exhausts from the left hand end of the bore 510 through the passage 551 port 550 groove 519 port 546 pipe 545 to the pipe 515. It will be seen that by means of the throttle valves 554 and 573 the speed of the piston 511 can readily be adjusted and thereby the length of its stroke can be adjusted assuming a certain speed of the valve piston 518 but that also is adjustable. Therefore a wide range of lengths of stroke can be given to the piston 511. The settings of the valves 528 and 538, however, should be such as to permit the valve piston 518 to complete its stroke before the diamond 524 contacts the grinding wheel 50 and it is noted that in Figure 16 the tool post 28 is a little to the right of its extreme left hand position. The valve 412 should be set to move the slide 407 quite slowly for efficient truing, and hence there is time for a fairly slow stroke of the valve piston 518 before the diamond 524 contacts the grinding wheel 50 in either direction, and by proper setting of the valves 554 and 573 the piston 511 may be made to take anything between a very small stroke and a full length stroke.

Figure 20:
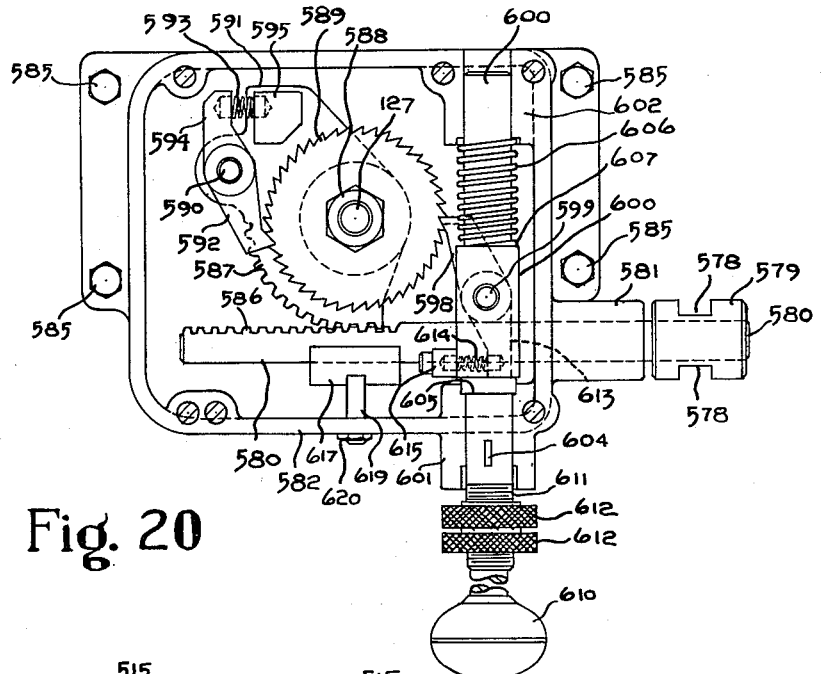
Figure 20 is a plan view of the ratchet mechanism of the compensator drive.

Referring now to Figures 20 and 21, on the right hand end of the valve piston 512 is an arm 576 having a yoke 577 the two arms of which fit in grooves 578 in a collar 579 fastened to a rod 580 extending through a journal box 581 on the outside of a casing 582 secured to the flat top portion 583 of a box shaped casing 584 that is attached to the rear side of the massive wheel guard 375. This casing 582 may be fastened to the casing 584 by means of bolts 585. For the location of the casings 582 and 584 and for an elevation for certain of the parts reference may be made to Figure 19.

Inside the casing 582 the rod 580 has rack teeth 586. These rack teeth 586 mesh with the teeth of a gear segment 587 which is journalled on the upper end of the shaft 127. Above the gear segment 587 and secured to the upper end of the shaft 127 as by means of a nut 588 is a ratchet gear 589. Pivotally mounted on a pin 590 extending upwardly from an outwardly extending portion 591 of the gear segment 587 is a pawl 592. This pawl 592 is maintained in ratcheting engagement with the ratchet gear 589 by means of a spring 593 engaging a tail 594 of the pawl 592 and seated in a boss 595 on the portion 591. It will thus be seen that the ratchet gear 589 is turned and the shaft 127 is therefore also turned whenever the piston 511 reciprocates in the bore 510 and that the angle through which the ratchet gear 589 and shaft 127 are turned is dependent upon the amplitude of the reciprocation of the piston 511.

I provide a hold pawl 598 engaging the ratchet gear 589 to prevent retrograde movement. This hold pawl 598 is mounted on a pin 599 extending through and beyond a shaft 600 which is slidable in a boss 601 and a boss 602 formed in the casing 582. These bosses 601 and 602 provide half bearings for the shaft 600, the remainder of the bearings being in corresponding bosses formed in the casing 509, the boss 603 complementary to the boss 601 being shown in Figure 19. The shaft 600 is keyed to the boss 603 by means of a key 604 to prevent the shaft 600 from turning. The shaft 600 has a shoulder 605 engaging the bosses 601 and 603 and a spring 606 on the shaft 600 engages another shoulder 607 on the shaft 600 and also boss 602 of the casing 582 and the complementary boss not shown of the casing 509 and therefore the shaft 600 is normally held in a fixed position in the casing 582 as shown but it can be pushed inwardly. When so pushed, the pawl 598 acts as an actuating pawl and the pawl 592 acts as a hold pawl and this feature is provided for manual compensation to adjust the diamond 424 downwardly and the slide 38 inwardly whenever desired. For convenience in moving the shaft 600, I provide a knob 610 on the front thereof and in order that the mechanism may be adjusted to pick one, two or three teeth of the ratchet gear 589 as desired, the shaft 600 has screw threads 611 outside of the casing 582 upon which threads are knurled nuts 612 which will strike the bosses 601 and 603 and limit the stroke of the shaft 600.

The pawl 598 has a tail 613 which is engaged by a spring 614 which is held in position by a spring seating member 615 attached to the shaft 600 and in this manner the pawl 598 is held in engagement with the ratchet gear 589. I desirably provide a slideway member 617 engaging and holding the rod 580 to hold the rack teeth 586 against the segment 587, and the rod 580 is preferably rectangular in cross section in the casing 582 and the slideway member 617 has a rectangular slideway thus to keep the rod 580 from turning. This slideway member 617 is held in position by a post 619 and nut 620.

Referring again to Figure 19, the sleeve nut 508 is secured to the inner race of a ball bearing 625 by means of a collar 626 on the sleeve 508 and a nut 627 on a threaded end of the sleeve 508. The outer race of the ball bearing 625 is held by a flanged sleeve 629 and a round cap 630 with a central hole 631, the cap being received within an integral casing portion 632 of the column 379. The cap 630 holds the flanged sleeve 629 down upon the surface 377 and thus the sleeve nut 508 is firmly secured against vertical movement but is freely rotatable.

A bevel gear 635 is formed on the bottom of the sleeve nut 508 and this bevel gear 635 meshes with a bevel gear 636 which is fast upon a horizontal shaft 637 to which is secured a worm wheel 638 meshing with a worm 639 on the shaft 127. The foregoing constitutes a driving connection to turn the sleeve nut 508 and therefore to lower the slide 382 whenever the compensator mechanism operates.

The horizontal shaft 637 is journalled in ball bearings 642 and 643. The inner race of the ball bearing 642 is held between a sleeve 644 abutting the hub of the worm wheel 638 and a nut 645 on the end of the shaft 637. The outer race of the ball bearing 642 is located in a cylindrical bore 646 in the box shaped casing 584 and is held in position by a cap 647 secured to this casing 584. The inner race of the ball bearing 643 is held between the hub of the bevel gear 636 and a shoulder 648 on the shaft 637 while the outer race of the ball bearing 643 is located in the cylindrical bore 650 of a boss 651 of the casing 584.

Still referring to Figure 19, the casing 584 has on the top wall thereof a downwardly extending boss 652 with a cylindrical bore receiving the outer race of a ball bearing 653 the inner race of which is on the shaft 127 and held between a collar 655 abutting the worm 639 and a nut 656 on the shaft 127. The outer race of the ball bearing 653 is held between a flange 657 on the bottom of the boss 652 and a cap 658 secured to the upper wall of the casing 584. Thus the shaft 127 is journalled in a thrust bearing.

I provide on the outside of the casing 509 valve wheels 660 and 661 to adjust the valves 528 and 538 respectively and also valve wheels 662 and 663 to adjust the valves 573 and 554 respectively.

Referring now to Figures 1 and 15, I provide a work rest base 665 which is adjustably mounted upon the slide 61 especially in order to line it up parallel to the axis of the regulating wheel 70. This slide 61 as will be remembered is movable perpendicular to the axis of the regulating wheel 70 and it partakes of the adjustment of the swivel table 56. Upon this work rest base 665 is detachably mounted a work rest blade 666 and many such blades can be provided for use in the machine having top surfaces of varying angles, etc. I provide an ejector rod 668 which may also be used as a stop on certain occasions. During infeed grinding this ejector rod 668 acts as a limit stop to position the work piece and at the end of the grinding operation moves toward the front of the machine to eject the work piece. I provide a cylinder 669 having a head 670 through which the rod 668 extends and a piston 671 in the cylinder 669, the rod 668 being secured to the piston 671. Another rod 672 extends through a cylinder head 673 on the rear end of the cylinder 669 and has on the outer end thereof a detent 674 which, when the piston moves forwardly in the cylinder 669, strikes the arm 675 of a limit switch 676 which in a manner to be hereinafter described causes the piston 671 to move rearwardly again to the position shown in Figure 15.

Figure 22:
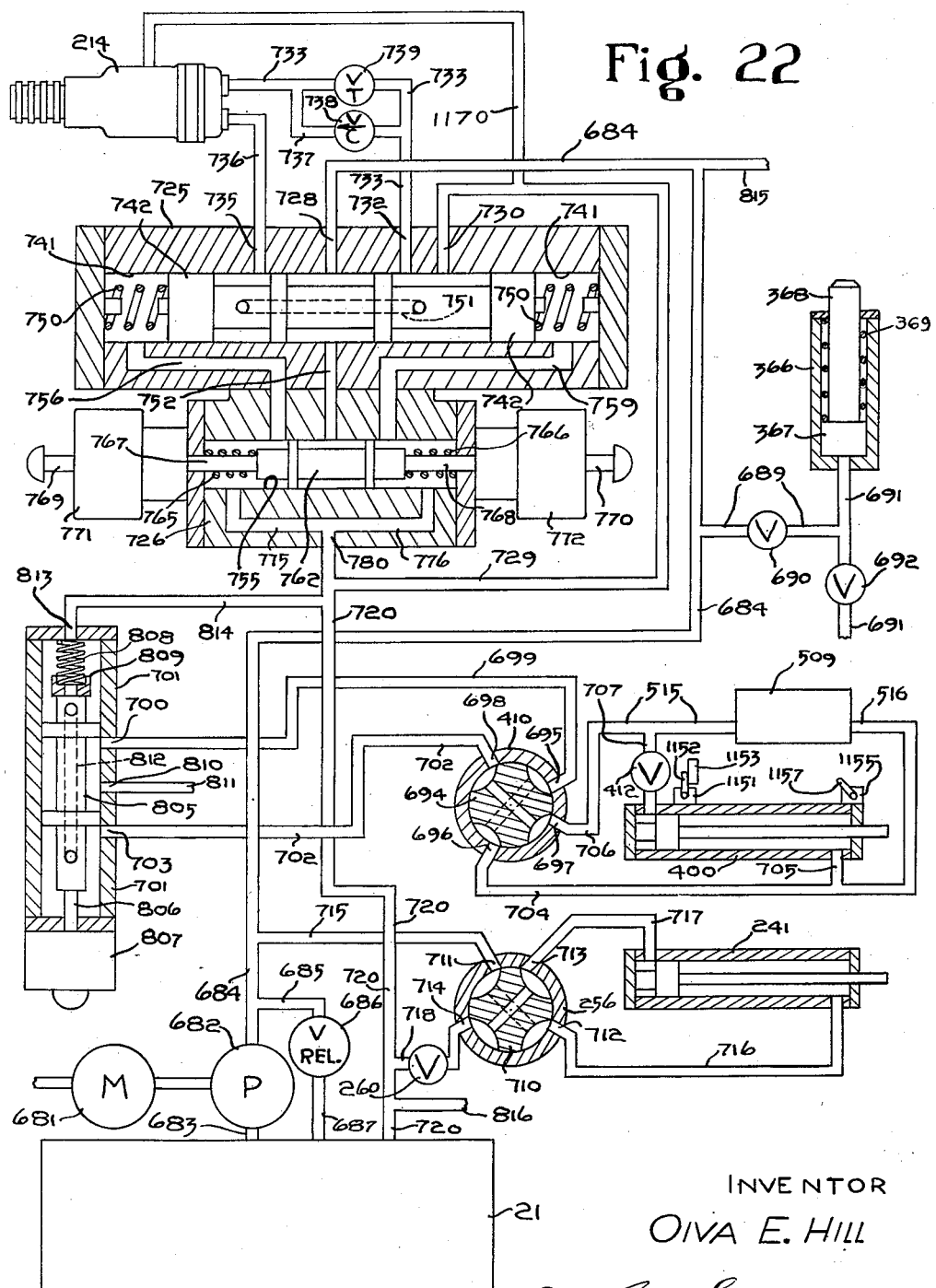
Figures 22 and 23 are diagrams of the hydraulic mechanism and connections.

Referring now to Figure 2, I provide on the rear of the machine a large box 680 which contains many of the hydraulic mechanisms now to be described. Referring now to Figure 22, a motor 681 located in the box 680 operates a pump 682 which supplies the power for operating the various hydraulic mechanisms. Through a pipe 683 the pump 682 draws oil or other hydraulic fluid from the tank 21 and pumps it into a main supply pipe 684 connected by a pipe 685 to a relief valve 686 having a discharge pipe 687 for returning oil to the tank 21 whenever the relief valve 686 operates. A pipe 689 having a shut-off valve 690 connects the main supply pipe 684 to a pipe 691 extending to the cylinder 366 which when placed under pressure stops the reciprocating of the grinding wheel spindle 47 as already described. The pipe 691 on the side of the pipe 689 remote from the cylinder 366 has another shut-off valve 692 and when the valve 690 is closed and the valve 692 is open, the piston 367 in the cylinder 366 is automatically operated to stop the reciprocations of the spindle 47 when the slide 38 starts to move outwardly. This is so that the grinding wheel may be trued whenever the slide 38 is out.

Located in the valve casing 410 is a four-way valve 694 turned by the handle 411 which in the position shown in Figure 22 connects a port 695 with a port 696 and also connects a port 697 with a port 698. The port 695 is connected by a pipe 699 to a port 700 of a valve casing 701. The port 698 is connected by a pipe 702 to a port 703 of the valve casing 701. Connections hereinafter described connect one of the ports 700 and 703 to pressure and the other one to exhaust whenever the slide 38 is out. The port 696 is connected by a pipe 704 to a pipe 705 leading to the rear end of the cylinder 400 and the pipe 704 is also connected to the pipe 516. The port 697 is connected to a pipe 706 which is connected by a pipe 707 to the front end of the cylinder 400 and the pipe 706 is also connected to the pipe 515. It will thus be seen that the grinding wheel 50 can be trued whenever the slide 38 is out merely by turning the valve handle 411 and that just prior to the diamond 424 contacting the grinding wheel 50, compensating as already described is effected.

Still referring to Figure 22, in the casing 256 is a four-way valve 710 operated by the handle 257 and which in one position connects a port 711 to a port 712 and also a port 713 to a port 714. The port 711 is connected by a pipe 715 to the main supply pipe 684. The port 712 is connected by a pipe 716 to the far end of the cylinder 241. The port 713 is connected by a pipe 717 to the front end of the cylinder 241 and the port 714 is connected by a pipe 718 to the main exhaust pipe 720. The pipe 718 has therein the needle valve 260. It will therefore be seen that the regulating wheel 70 can be trued at any time by moving the handle 275 but this should not be attempted unless the regulating wheel is turning at high speed which can be done by means of a selector switch as will now be described.

Still referring to Figure 22, a valve casing 725 and a pilot valve casing 726 connected to the valve casing 725 are located in the box 680. The main supply pipe 684 leads to a port 728 in the valve casing 725. A pipe 729 extends from a port 730 in the valve casing 725 to the main exhaust pipe 720. A port 732 in the valve casing 725 is connected by a pipe 733 to the variable speed hydraulic motor 214. A port 735 in the valve casing 725 is connected by a pipe 736 to the other end of the motor 214.

A pipe 737 shunts part of the pipe 733. The pipe 737 contains a check valve 738 so that oil can flow in the pipe 737 towards the motor 214 but not away from it. The pipe 733 in the part shunted by the pipe 737 contains a throttle valve 739 the setting of which is automatically varied during infeed grinding at which time the oil is flowing out of the motor 214 via the pipe 733. Thus the motor 214 operates at throttled varying slow speed in a given direction of rotation for driving the regulating wheel during infeed grinding, and at throttled slow speed in such given direction of rotation for driving the regulating wheel during through feed grinding, but at unthrottled high speed in the opposite direction of rotation for driving the regulating wheel at high speed for truing, because when the oil is directed into the pipe 733 it can flow through the pipe 737 and through the check valve 738, bypassing the throttle valve 739.

In a bore 741 of the valve casing 725 is a valve piston 742 having four lands and three grooves. This valve piston 742 is urged to the central position shown by means of springs 750 in which position the main supply pipe 684 is not connected to either of the pipes 733 or 736, these pipes being connected to the exhaust pipe 729 because the right and left hand grooves of the valve piston 742 are connected by a passage 751 in the valve 742 and the right hand groove is in communication with the port 730.

In the valve casing 725 opposite the port 728 is a port 752 which is also a passage to convey fluid to the center of a cylinder bore 755 in the casing 726. A passage ending in ports 756 connects the left hand end of the bore 741 with the left hand end of the bore 755. A passage ending in ports 759 connects the right hand end of the bore 741 with the right hand end of the bore 755. In the bore 755 is a valve piston 762 having a groove between two lands. This valve piston 762 is urged to the central balanced position shown by means of spring 765 and 766 surrounding rods 767 and 768 which are connected to the valve piston 762 and also to the cores 769 and 770 of solenoids 771 and 772. When the solenoid 771 is energized, the valve piston 762 is shifted to the right and when the solenoid 772 is energized the valve piston 762 is shifted to the left.

The ends of the bore 755 are connected by passages 775 and 776 ending in ports at the bore 755 to a port 780 connected to the main exhaust pipe 720. From consideration of Figure 22 it will now be seen that when the solenoid 771 is energized and the valve piston 762 is moved to the right, the fluid will flow from the main supply pipe 684 through the port 728 through the port and passage 752 to the passage 759 and through it to the right hand end of the bore 741 shifting the valve piston 742 to the left whereupon fluid will flow into the port 735 and through the pipe 736 into the motor 214 then out of the motor 214 through the pipe 733 containing the throttle valve 739 then by way of port 732 and port 730 to pipe 729 to the main exhaust pipe 720. And it will further be seen that when the solenoid 772 is energized and the valve piston 762 is moved to the left, the fluid will flow from the main supply pipe 684 through the port 728 through the port and passage 752 to the passage 756 and through it to the left hand end of the bore 741 shifting the valve piston 742 to the right whereupon fluid will flow into the port 732 and through the pipe 733 and the pipe 737 and through the check valve 738 into motor 214 then out of the motor 214 through the pipe 736 and by way of port 735 and through the passage 751 to the port 730 and through pipe 729 to the main exhaust pipe 720. It will further be apparent that the valve piston 762 is never stopped from moving by oil pressure since the ends of the bore 755 in which it moves are connected to exhaust, and likewise that the end of the bore 741 towards which the valve piston 742 is moving is at such time also connected to exhaust via the passage 756 or 759 as the case may be.

Figure 24:
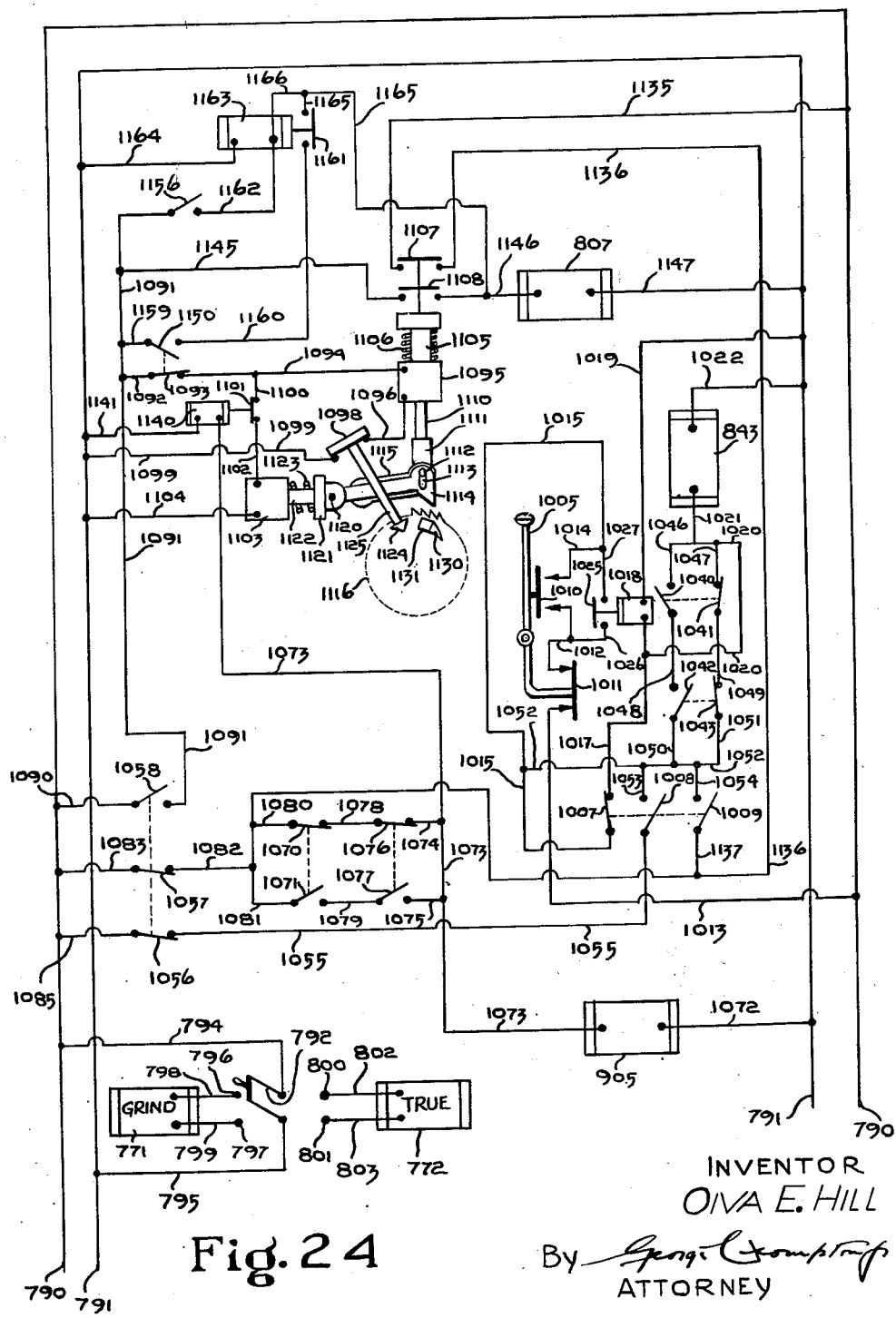
Figure 24 is a wiring diagram.

Referring now to Figure 24, for operation of the various solenoids a source of electric energy is connected to the machine and this in most machine shops will usually be alternating current electricity. Figure 24 is a diagram of electric connections which will cause the machine to operate as desired. Accordingly the power lines are indicated at 790 and 791. I provide a selector switch 792 connected by wires 794 and 795 to the lines 790 and 791. A pair of terminals 796 and 797 are connected by wires 798 and 799 to the solenoid 771 and a pair of terminals 800 and 801 are connected by wires 802 and 803 to the solenoid 772. Therefore by means of the selector switch 792 the regulating wheel 70 can be caused to revolve at controlled slow speed for grinding or at high speed for truing. When grinding the regulating wheel will revolve clockwise, Figure 1, so therefore for truing it is revolved counter-clockwise.

In some cases it is desirable that the grinding wheel be trued and compensated automatically after some predetermined number of infeed grinding cycles. Or, in the case of through feed grinding, it may be desirable to have the grinding wheel trued and compensated automatically after some predetermined length of time. Mechanism for doing such will save the operator the job of counting cycles or keeping track of the elapsed time since the last truing. Accordingly the machine optionally has fluid pressure mechanism and connections for automatically causing truing of the grinding wheel as will now be described.

Referring to Figure 22, the valve casing 701 contains a valve piston 805 with two lands and one groove. The valve piston 805 is connected by means of a rod 806 to the core, not shown, of a solenoid 807. When the solenoid 807 is energized the valve piston 805 is moved to the position shown in Figure 22 and during grinding it is normally so energized. When the solenoid 807 is deenergized a spring 808 pushing against a seat 809 on the valve piston 805 moves it downwardly (Figure 22) and this causes the diamond 424 to make a single stroke across the grinding wheel 50 and subsequent reenergization of the solenoid 807 causes the diamond 424 to make the return stroke across the grinding wheel 50.

With the valve piston 805 in the position shown the port 700 is connected to a port 810 which is connected to a pipe 811 that is connected to fluid pressure whenever the slide 38 is out in a manner presently to be described. But when the valve piston 805 is down, the port 703 is connected to the port 810. There is a bore 812 in the valve piston 805 opening to the upper and lower ends of the valve piston 805 and since the upper end of the casing 701 is connected by a port 813 to a pipe 814 connected to the main exhaust pipe 720, it will be seen that one of the pipes 699 and 702 is always connected to exhaust.

From the foregoing description and according to the drawings it will be seen that, assuming there is pressure in the pipe 811, compensation together with a single truing stroke will be obtained whenever either one of the valves 694 or 805 is moved. The adjustable needle valve 412 is located in the pipe 707 to control the speed of movement of the diamond 424 without effect on the compensating mechanism.

Figure 23:
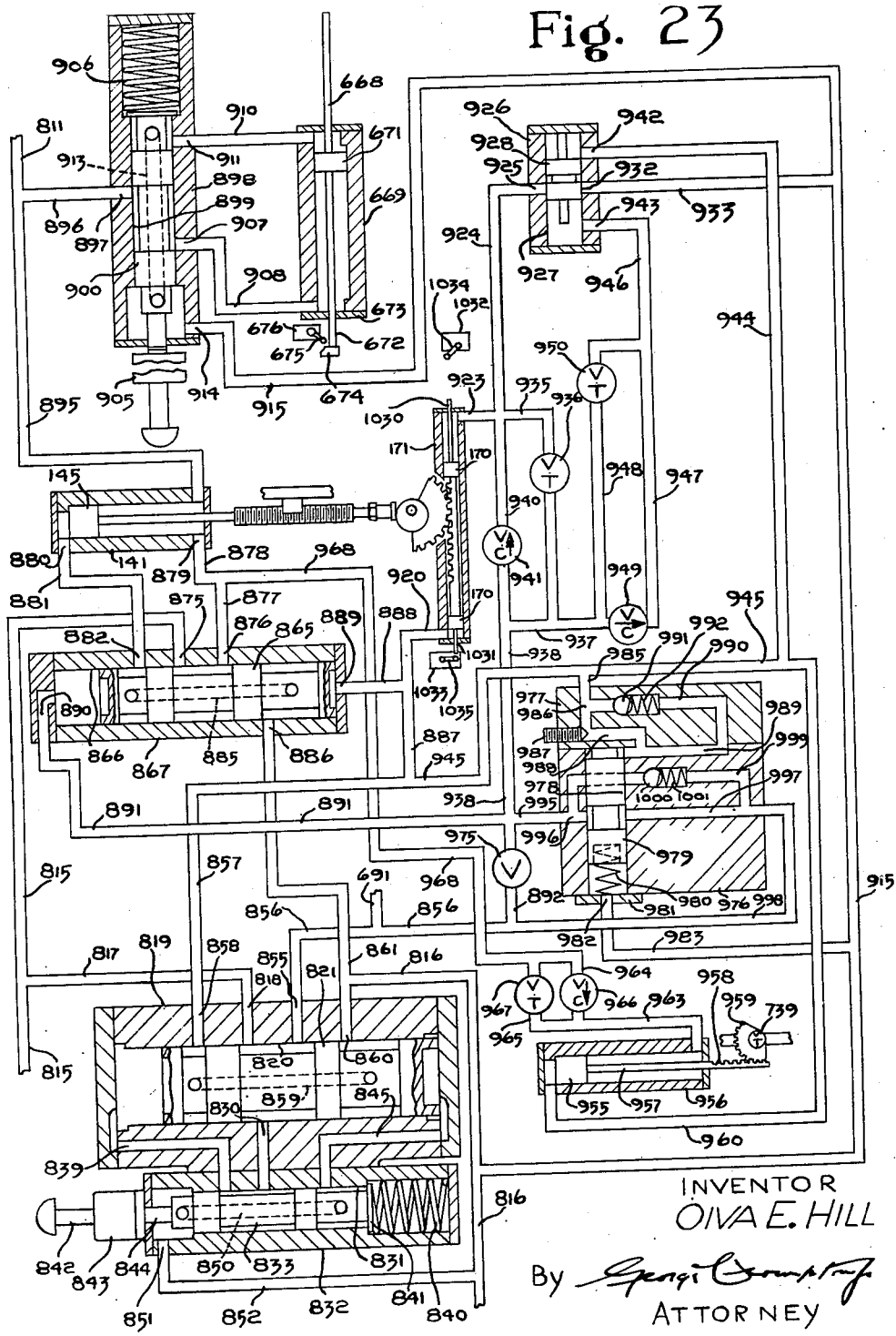

A branch pipe 815 from the main supply pipe 684 takes fluid under pressure to the mechanisms shown in Figure 23, and an exhaust pipe 816 connected to the main exhaust pipe 720 receives fluid from the mechanisms of Figure 23.

Referring now to Figure 23, the branch pipe 815 is connected to a pipe 817 that leads to a port 818 in a valve casing 819. In the bore 820 of the valve casing 819 is a valve piston 821 having four lands and three grooves as shown. At all times the port 818 is connected to ports and passage 830 leading into the bore 831 of a pilot valve casing 832 which is connected to the valve casing 819. In the bore 831 of the pilot valve casing 832 is a piston 833 having two lands with a groove between them as shown. With the valve piston 833 to the left, as shown, the ports and passage 830 are connected to ports and passage 839 which lead to the left hand end of the bore 820. Thus the valve piston 821 is held to the right by pressure whenever the valve piston 833 is in its left hand position where it is normally held by a spring 840 thrusting against a seat 841 on the valve piston 833 which seat also acts as a stop, as indicated.

The core 842 of a solenoid 843 is connected by a rod 844 to the valve piston 833 and when the solenoid 843 is energized the valve piston 833 is shifted to the right. Then the ports and passage 830 are connected to ports and passage 845 leading to the right hand end of the bore 820 thus sending the valve piston 821 to the left. Whichever set of ports and passage 839 and ports and passage 845 that is not connected to ports and passage 830 is connected to exhaust because the left hand end of the valve piston 833 is connected to the right hand end thereof by means of a passage 850 in the valve piston 833, and the left hand end of the bore 831 has a port 851 connected by a pipe 852 to the exhaust pipe 816.

In the position of the valve piston 821 as shown, the port 818 is connected to a port 855 which is connected to a pipe 856 and thus the pipe 856 is under pressure. At the same time a pipe 857 which is connected to a port 858 is connected by way of a passage 859 in the valve piston 821 to a port 860 which is connected to a pipe 861 which is connected to the exhaust pipe 816. When the valve piston 821 is moved to the left, the ports 818 and 858 are connected, thus connecting the pipe 857 to pressure, while the ports 855 and 860 are connected, thus connecting the pipe 856 to exhaust.

The valve mechanism comprising the valve piston 821 in the casing 819 is a main control valve which is operated by the pilot valve comprising the valve piston 833 in the casing 832 and the pilot valve is operated by the solenoid 843. Energization of the solenoid 843 starts a grinding operation. A valve mechanism comprising a valve piston 865 in a bore 866 of a valve casing 867 operates the piston 145 in the cylinder 141 to move the slide 38, this valve mechanism being itself under the control of the main control valve.

The valve piston 865 has four lands and three grooves. A port 875 in the valve casing 867 is connected to the branch pipe 815 and when the valve piston 865 is in its right hand position, as shown, this port 875 is connected to a port 876 which is connected by a pipe 877 and a pipe 878 to a port 879 in the cylinder 141. Under such conditions the slide 38 is in the remote position. And at such time a port 880 at the other end of the cylinder 141 is connected by a pipe 881 to a port 882 in the casing 867. The valve piston 865 has therein a passage 885 connecting the right and left hand end grooves of the valve piston 865, and with this piston to the right, the port 882 is connected to a port 886 which is connected to the pipe 861 that is connected to the exhaust pipe 816. But when the valve piston 865 is moved to the left the port 882 is connected to the pressure port 875 and the port 876 is connected to the exhaust port 886 and then the piston 145 will be moved to the right in the cylinder 141.

When the valve piston 821 is moved to the left responsive to energization of the solenoid 843, the pressure port 818 is connected to the port 858 thus sending fluid to the pipe 857 as explained. This pipe 857 is connected to a pipe 887 which is connected to a pipe 888 that is connected to a port 889 in the casing 867 at the right hand end of the bore 866. Consequently energization of the solenoid 843 causes the valve piston 865 to move to the left and therefore causes the piston 145 to move to the right moving the slide 38 to carry the grinding wheel 50 towards the work. As the valve piston 865 moves to the left, fluid can exhaust from the left hand end of the bore 866 via ports and passage 890 in the casing 867, and a pipe 891 which is connected by a pipe 892 to the pipe 856 which at this time is connected to exhaust. Conversely deenergization of the solenoid 843 causes fluid to flow to the left hand end of the bore 866 to move the valve piston 865 to the right.

At the end of a grinding operation, when doing infeed grinding, the ejector rod 668 is actuated to eject the finished work piece. Referring to Figure 23, fluid flows by way of a pipe 895 to a pipe 896 to a port 897 in a valve casing 898 in which is a bore 899 containing a valve piston 900 having two lands and a groove. The valve piston 900 is controlled by a solenoid 905 and a spring 906. When the solenoid 905 is deenergized as shown in Figure 23, the fluid can pass from the port 897 to a port 907 and by way of a pipe 908 to the rear end of the cylinder 669 thus moving the piston 671 and the ejector rod 668 to the position shown in Figure 23 ejecting a work piece. However at the end of the stroke the detent 674 strikes the arm 675 of the limit switch 676 and this energizes the solenoid 905 which shifts the valve piston 900. The front end of the cylinder 669 is connected by a pipe 910 to a port 911 in the casing 898 and when the solenoid 905 is deenergized, fluid can exhaust from the front end of the cylinder 669 through a passage 913 in the valve piston 900 and by way of a port 914 into a pipe 915 which is connected to the exhaust pipe 816. When the solenoid 905 is energized, the port 911 is connected to the port 897 while the port 907 is connected to the port 914. From Figure 23 it will be seen that the pipe 895 is connected to the pipe 878 as shown via the right hand end of the cylinder 141 so that the pipe 895 is under pressure as soon as the piston 145 starts back that is to the left in Figure 23.

The pipe 887 is connected by means of a pipe 920 to the front end of the cylinder 171 so that when the pressure is applied in the pipe 887 to move the valve piston 865 to the left, the pressure is also applied to move the piston 170 to start the fine feed. I provide means for causing the first part of this movement to occur at a rapid rate so as to avoid the grinding of air. To this end the exhaust from the rear end of the cylinder 171 via a pipe 923 is at a rapid rate for a short time and thereafter is at a slow rate. The pipe 923 is connected to a pipe 924 which is connected to a port 925 in a shuttle valve casing 926. In the bore 927 of the shuttle valve casing 926 is a valve piston 928 having two lands and a groove. Opposite the port 925 is a port 932 which is connected by a pipe 933 to the pipe 915 which as above stated is connected to the exhaust pipe 816. As the valve piston 928 moves by the ports 925 and 932 there is a moment of time when fluid from the cylinder 171 can exhaust quickly and then this exit is cut off. After the exit is cut off through the above described valve mechanism which is a shuttle valve, fluid from the cylinder 171 can exhaust by way of a pipe 935 through a throttle valve 936 through a pipe 937 through a pipe 938 through the pipe 892 to the pipe 856 which at that time is connected to the pipe 861 and the exhaust pipe 816. For resetting the piston 170 when the pipe 856 is under pressure, fluid flows through the pipe 892 and the pipe 938 and a shunting pipe 940 having a check valve 941 which allows the fluid to flow up (Figure 23) but not down.

The shuttle valve casing 926 has near the opposite ends thereof ports 942 and 943. The port 942 is connected to a pipe 944 which is connected to a pipe 945 which is connected to the pipe 857. The port 943 is connected by a pipe 946 to a pair of pipes in parallel 947 and 948, the former having a check valve 949 and the latter having a throttle valve 950. The check valve 949 prevents fluid flowing away from the shuttle valve casing 926 but allows fluid to flow towards the shuttle valve casing 926. From the connections described it will be seen that at the start of the infeed movement of the wheel slide 38, the valve piston 928 moves downwardly (Fig. 23) at a rate determined by the setting of the throttle valve 950 but when the wheel slide 38 starts to move outwardly, the valve piston 928 moves rapidly upwardly.

The throttle valve 739 is controlled by a piston 955 in a cylinder 956, the piston having a piston rod 957 having connected thereto or formed thereon a rack 958 which operates a gear segment 959 mounted on the rotatable part of the throttle valve 739. The far end of the cylinder 956 is connected by a pipe 960 to the pipe 945, The near end of the cylinder 956 is connected by a pipe 963 to a pair of pipes 964 and 965 in parallel, the former having a check valve 966 and the latter having a throttle valve 967. These pipes 964 and 965 are connected by a pipe 968 to the pipe 877. These pipes 945 and 877 are alternately connected to pressure and exhaust at times in the cycles of operations as already indicated. Accordingly when grinding commences the piston 955 moves to the right slowly to close the throttle valve 739 (but not shutting it off entirely) but when the slide 38 moves outwardly the piston 955 resets the throttle valve 739. Resetting is at high speed because the fluid then flows through the check valve 966 while change in throttling is at a slow speed as controlled by the other throttle valve 967 since when the fluid is exhausting through the pipe 963 it must flow through the throttle valve 967.

I preferably provide a mechanism which will now be described to provide a dwell to allow the grinding wheel to spark out on the work piece. In other words when the slide 38 has moved to its extreme inward position this fluid mechanism will delay the return movement of the slide to permit grinding to be continued under the pressure created by strain in the machine parts which is known as sparking out. Furthermore this mechanism can readily be put out of action so that when, for example, doing rough grinding there will not be any dwell for the purpose of sparking out. Referring now to Figure 23, the pipe 892 has a shut off valve 975 which when closed forces the fluid to go through the mechanism and passages now to be described instead of through the pipe 892.

I provide a metal block 976 and another metal block 977 and secure them together so that for practical purposes they may be considered to be one piece. In the metal block 976 is a cylindrical bore 978. In the cylindrical bore 978 is a valve piston 979 with two lands and one groove. At the end of the bore 978 is a spring 980 held in place by a cylinder head 981 having a port 982. The spring 980 is always urging the valve piston 979 upwardly (Fig. 23). The port 982 is at all times connected by a pipe 983 to the pipe 915 which is connected to the exhaust pipe 816 so that the valve piston 979 may at any time be moved downwardly if pressure is exerted in the upper end of the bore 978.

The pipe 945 which as will be remembered is under pressure during the grinding operation is connected by a pipe 985 with a passage 986 in the block 977. This passage 986 leads to a screw needle 987 connecting to a passage 988 which leads to a passage 989 in the block 976. The passage 989 ends at the upper end of the bore 978. A shunting passage 990 connects the passage 986 with the passage 989 and has a ball check valve 991 operated by a spring 992. When the pipe 945 is under pressure the fluid can flow through the ball check valve 991 to the upper end of the cylinder bore 978 and then the valve piston 979 will move downwardly fast.

The pipe 891 is connected by a pipe 995 to a passage 996 in the block 976. This passage 996 extends to the bore 978. Opposite the passage 996 is a passage 997 in the block 976 and the passage 997 is connected to a pipe 998 which is connected to the pipe 856. It will be seen that when the valve piston 979 is moved to its lowermost position, fluid cannot flow through the pipe 995, the passage 996 to passage 997 and pipe 998 but when the valve piston 979 is up, fluid can flow through such passages and pipes. I further provide a shunting passage 999 in the block 976 containing a ball check valve 1000 operated by a spring 1001. At the start of a grinding operation the valve piston 865 can move fast because the fluid exhausting through pipe 891 can pass through pipe 995 and shunt passage 999 via the ball check valve 1000. At the end of a grinding operation, when the pipe 856 is a pressure pipe, fluid cannot immediately flow through the passage 997 because the valve piston 979 is blocking the flow and the ball check valve 1000 will not permit the fluid to flow. But after a time controlled by the setting of the screw needle 987, the valve piston 979 has connected the passages 996 and 997 and then the fluid can flow to move the valve piston 865 to the right thus sending the slide 38 to its remote position. The valve piston 979 also delays the resetting of the piston 170.

As shown in Figure 23, the pipe 811 is connected to the pipe 895 for supplying fluid to the valve casing 701 (Figure 22) at the proper time. And as also shown in Figure 23, the pipe 691 is connected to the pipe 856 for optionally sending oil to the cylinder 366 to stop the reciprocations of the grinding wheel 50 only when the slide 38 moves out.

The machine is organized to perform infeed grinding in four different ways. Any one of these ways may be readily selected by placing certain switches in certain position. One of these ways of grinding can be best called hand controlled grinding according to which the operator moves a lever 1005, Figure 1, and this causes the slide 38 to move inwardly and then to feed slowly and finally come to a stop. Whenever the operator decides that the grinding operation is completed he moves the lever 1005 again and the slide 38 moves outwardly and stops.

According to the second of these ways of grinding, which may be called semi-automatic infeed grinding, the operator moves the lever 1005 and then the slide 38 moves inwardly, feeds finely, stops for a moment if desired and eventually returns outwardly and stops.

According to the third way of infeed grinding, which may be called automatic grinding with automatic truing, the slide 38 moves in and out in the manner already described for as many cycles as desired, then compensating and truing of the grinding wheel takes place automatically, and then the slide 38 again moves in and out for the same number of cycles, compensating and truing again takes place automatically, and so on indefinitely.

The fourth way of infeed grinding may be called automatic grinding without automatic truing and when the machine is set to operate in this manner the slide 38 moves in and out indefinitely without any pause for truing.

Referring now to Figure 1, there is a knob 1006 on the left hand side of the front of the machine which controls three switches shown in Figure 24. When the knob 1006 is turned to the right a switch 1007 is closed and switches 1008 and 1009 are open. So far as these switches are concerned the machine is now set for hand grinding. When the knob is in its mid position all three switches 1007, 1008 and 1009 are open, and so far as these switches are concerned the machine is ready for semi-automatic infeed grinding. When the knob 1006 is turned to the left, the switch 1007 is still open and the switches 1008 and 1009 are closed and so far as these switches are concerned the machine is now set for automatic grinding with or without automatic compensating and truing.

Referring now to Figure 24, the lever 1005 operates a push button two point make switch 1010 and a push button two point break switch 1011. With the lever 1005 in its mid or neutral position, the switch 1010 is open and the switch 1011 is closed. When the lever 1005 is moved in one direction that is to say in in Figure 1, the switch 1010 is closed and the switch 1011 remains closed. When the lever 1005 is pulled out the switch 1011 is opened and the switch 1010 remains opened.

The switches 1010 and 1011 are connected by a wire 1012 on one side of each thereof. The other side of the switch 1011 is connected by a wire 1013 to the power line 790. The other side of the switch 1010 is connected by a wire 1014 and a wire 1015 to one terminal of the switch 1007. The other terminal of the switch 1007 is connected by a wire 1017 to one end of a relay 1018 the other end of which is connected by a wire 1019 to the power line 791. Thus whenever the switches 1010, 1011 and 1007 are closed, the relay 1018 is energized. At the same time current can also flow by way of a branch wire 1020 and a wire 1021 to the solenoid 843, the other end of which is connected by a wire 1022 to the power line 791. Thus whenever the switch 1010 is closed the solenoid 843 is energized and this as will be remembered shifts the valve piston 833 which in turn shifts the valve piston 821 which in turn shifts the valve piston 865 which causes the piston 145 to move to the right to move the slide 38 to carry the grinding wheel 50 towards the work piece and at the same time starts the fine feed piston 170 moving.

The purpose of the relay 1018 is to provide a holding circuit because when the operator lets go of the lever 1005 the circuit through the switch 1010 is broken. Accordingly the relay 1018 operates a normally open switch 1025 to connect a pair of wires 1026 and 1027. The wire 1026 is connected to the wire 1012 and the wire 1027 is connected to the wire 1015 so the circuit is held.

When the operator, controlling the machine by hand, decides the grinding operation is finished, he has only to pull the lever 1005 towards him which opens the switch 1011, which breaks the circuit and deenergizes the solenoid 843 whereupon, as already described, the slide 38 moves outwardly and stops.

Referring now for a moment to Figure 23, the piston 170, which is a double piston as shown, has piston rods 1030 and 1031 projecting from the opposite ends of the cylinder 171 for the purpose of operating limit switch mechanisms located in boxes 1032 and 1033 respectively. Outside of these boxes 1032 and 1033 are switch arms 1034 and 1035 respectively which arms operate the switches. In the box 1032 are switches 1040 and 1041 which are simultaneously operated whenever the arm 1034 moves. These are maintain contact switches and when 1040 is closed 1041 is opened and vice versa. Furthermore one oscillation of the arm 1034 by the piston rod 1030 changes the position of each switch which thereupon maintains such position until the arm is again operated whereupon the position of each switch is again changed. In the box 1033 are switches 1042 and 1043 which are of the same kind as switches 1040 and 1041 and which are operated by the arm 1035.

The switches 1040, 1041, 1042 and 1043 are indicated in Figure 24 and as shown one terminal of each of the switches 1040 and 1041 is connected to the solenoid 843 by means of wires 1046 and 1047 and the wires 1020 and 1021. The other terminals of the switches 1040 and 1041 are connected by means of wires 1048 and 1049 to terminals of the switches 1042 and 1043 respectively. The remaining terminals of the switches 1042 and 1043 are connected by wires 1050 and 1051 to a wire 1052 which is connected to wires 1053 and 1054 which are respectively connected to terminals of the switches 1008 and 1009. The other terminal of the switch 1008 is connected by a wire 1055 to a switch 1056 of three switches mechanically connected, the other two being numbered 1057 and 1058. These three switches 1056, 1057 and 1058 have two positions, in one of which 1056 and 1057 are closed and 1058 is open, as shown, while in the other position 1056 and 1057 are open while 1058 is closed. They are controlled by a knob 1060 on the front of the machine on the left hand side, see Figure 1. When the knob 1060 is turned to the left, the condition of these switches 1056, 1057 and 1058 is as shown in Figure 24 and when it is turned to the right the switches 1056 and 1057 are open and the switch 1058 is closed.

This knob 1060 is set to the left to keep the counter (to be described) from operating and should be so set for semi-automatic grinding. When the knob 1060 is set to the right the counter will operate when doing automatic grinding, but when set to the left the counter is inoperative when doing automatic grinding.

I will now describe how the circuits operate when doing semi-automatic grinding. The operator turns the knob 1006 to the mid position to open all of the switches 1007, 1008 and 1009. At this time a pair of the four switches 1040 and 1042 or 1041 and 1043 are closed and the other pair are open, such as indicated in Figure 24 where the pair 1041 and 1043 are shown closed and the pair 1040 and 1042 are shown open. It will be noted that these pairs are in parallel. When the operator moves the lever 1005 to close the switch 1010 the current flows as follows: from power line 790 via wire 1013 to switch 1011 to wire 1012 to switch 1010 to wire 1014 to wire 1015 to wire 1052 to wire 1051 through switch 1043 to wire 1049 through switch 1041 to wire 1047 to wire 1020 to wire 1021 through solenoid 843 to wire 1022 to the power line 791. At the same time current also flows from the wire 1020 to the wire 1017 through the relay 1018 to the wire 1019 to the power line 791. This closes the switch 1025 and then the current continues to flow from the wire 1012 via the wire 1026 through the switch 1025 to wire 1027 to wire 1015 and then as above described through the solenoid 843. Thus opening of the switch 1010 does not break the circuit.

Thus the slide 38 moves in, at first fast and then slowly by operation of the piston 170 and finally the piston rod 1030 strikes the arm 1034 opening the switch 1041 and closing the switch 1040. This as will be readily apparent deenergizes the solenoid 843 and therefore the slide 38 moves outwardly. At the same time the circuit through the relay 1018 is broken.

Besides the switches 1040 and 1041 there are in the box 1032 a pair of switches 1070 and 1071 which are of the same kind as the switches 1040 and 1041 and are likewise operated by the arm 1034. These switches 1070 and 1071 are in parallel circuits to control the operation of the ejector solenoid 905. Referring now to Figure 24, one terminal of the solenoid 905 is connected by a wire 1072 to the power line 791. The other terminal of the solenoid 905 is connected by a wire 1073 to a pair of wires 1074 and 1075 which are respectively connected to terminals of switches 1076 and 1077. The other terminals of the switches 1076 and 1077 are connected by wires 1078 and 1079 to terminals of the switches 1070 and 1071. The remaining terminals of the switches 1070 and 1071 are connected by wires 1080 and 1081 to a wire 1082 which is connected to one terminal of the switch 1057, the other terminal of which is connected by a wire 1083 to the power line 799. During grinding the solenoid 905 is energized because either the switches 1070 and 1076 or the switches 1071 and 1077 are closed. But when the rod 1030 strikes the arm 1034 the switches 1070 and 1071 are operated which breaks the circuit from the wire 1073 to the wire 1082 and deenergizes the solenoid 905 which causes the ejector rod 668 to eject the work piece.

The switches 1076 and 1077 collectively constitute the limit switch 676 already mentioned operated by the arm 675 when it is struck by the detent 674 on the rod 672. The switches 1076 and 1077 of the limit switch 676 are maintain contact switches of the same type as the switches 1070 and 1071, 1040 and 1041, 1042 and 1043. The circuit having been broken by actuation of the switches 1070 and 1071, it is re-made when the switches 1076 and 1077 are operated due to the detent 674 striking the arm 675. Thereupon the ejector rod 668 retreats and the circuits are then set so that subsequent actuation of the arm 1034 will again cause the ejector rod 668 to move forwardly.

It will be easier to describe next the fourth condition of grinding, that is to say automatic continuous grinding with the counter inoperative and with the wheel slide 38 moving in and out in continuous cycles. When so operating, the operator does not move the lever 1005 at all. Instead, the knob 1060 being to the left to put the switches 1056, 1057 and 1058 into the conditions shown in Figure 24, the operator turns the knob 1006 to the left to open the switch 1007 and close the switches 1008 and 1009.

The switch 1056 is connected by a wire 1085 to the power line 790. Current now flows from the power line 790 via the wire 1085 through the switch 1056 then through the wire 1055 through the switch 1008 to the wire 1053 to the wire 1052 and the wire 1051 through the switch 1043 wire 1049 through the switch 1041 to the wire 1047 to the wire 1020 to the wire 1021 through the solenoid 843 to the wire 1022 to the power line 791.

Energization of the solenoid 843 of course moves the wheel slide 38 in and eventually the rod 1030 strikes the arm 1034 which changes the position of the switches 1040 and 1041 thus breaking the circuit through the solenoid 843 and causing the slide 38 to retreat. However, when the slide 38 is fully out, the rod 1031 strikes the arm 1035 thus changing the position of the switches 1042 and 1043 which reestablishes the circuit. It will readily be seen that the ejector is also automatically operated in the manner already described.

I will now describe automatic grinding with the counter operating which causes automatic truing at the end of a predetermined number of grinding cycles. The machine has an electric counting mechanism of which only the main parts will be diagrammatically shown together with the electric circuits. These counters are made by electrical manufacturers and are on sale, so it seems unnecessary for me to describe every mechanical feature thereof, nevertheless enough description will be given herein so that one skilled in the art could readily make one for himself if he chose to do so.

For this third condition of grinding, that is to say automatic grinding with automatic truing, the knob 1060 is turned to the right to close the switch 1058 and open the switches 1057 and 1056. Grinding starts whenever the operator turns the knob 1006 to the left to open the switch 1007 and to close the switches 1008 and 1009. Current now flows from the power line 790 via a wire 1090 to the switch 1058, through this switch and then by a wire 1091 connected to the switch 1058 to a wire 1092 and through a switch 1093 which is at that time closed to a wire 1094 which connects one end of the switch 1093 to a relay pawl coil 1095 and then through a wire 1096 connected to the other terminal of the relay pawl coil 1095 to a terminal of a normally closed switch 1098 then through the switch and then by a wire 1099 to the power line 791. At the same time current also flows from the wire 1094 through a wire 1100 through a normally closed switch 1101 to a wire 1102 through an actuating coil 1103 and then by a wire 1104 to the power line 791.

The relay pawl coil 1095 has a double function. It is, as most relays are, a solenoid and it has a core 1105 which is pulled downwardly whenever the coil 1095 is energized but which is otherwise held up by means of a spring 1106. This core 1105 actuates a pair of switches 1107 and 1108 which are relay switches. On the lower side of the coil 1095 is a rod 1110 which is integrally connected to the core rod 1105 but the rod 1110 may be made of brass so that the solenoid 1095 cannot draw it. On the end of the rod 1110 is a head 1111 having a pin 1112 projecting through slots 1113 in a pair of pawls 1114 and 1115, the pawl 1114 being an actuating pawl and the pawl 1115 being a hold pawl. This mechanism including the coil 1095 and the parts from 1110 through 1115 inclusive is part of the counter. The pawls 1114 and 1115 are held away from a ratchet wheel 1116 when the coil 1095 is deenergized, but when the coil 1095 is energized the pin 1112 moves downwardly and allows both pawls 1114 and 1115 to engage the ratchet wheel 1116.

The hold pawl 1115 is mounted on a stationary pivot pin not shown. The pawl 1114 is connected by a pin 1120 to a head 1121 on the end of a core 1122 of the actuating coil 1103 which is a solenoid coil. A spring 1123 on the core 1122 and thrusting against the head 1121 moves the pawl 1114 to the right whenever the coil 1103 is deenergized and whenever the coil 1103 is energized the pawl 1114 is drawn back. It will thus be seen that alternate energization and deenergization of the coil 1103 causes reciprocation of the pawl 1114 to rotate the ratchet wheel 1116 step by step as the hold pawl 1115 holds the ratchet wheel 1116 from retrograde movement. A clock spring, not shown, is at all times attempting to turn the ratchet wheel 1116 in a retrograde direction, that is counter-clockwise. The mechanism described in this paragraph is also part of the counter.

The counter further includes a detent 1124 on the end of a rod 1125 which is movable in the direction of its axis and spring-held in the position as shown. The normally closed switch 1098 is actuated by this rod 1125. The detent 1124 is positioned to be engaged by a cam 1130 carried by ratchet wheel 1116 and when so engaged the detent 1124 and the rod 1125 are moved outwardly opening the switch 1098. The clock spring, not shown, moves the cam 1130 against a stop block 1131 whenever the pawls 1114 and 1115 are lifted and this position, as shown in Figure 24, is the starting position of the counting mechanism. The stop block 1131 is mounted on a rotatable part, not shown, of the counting mechanism coaxial with the ratchet wheel 1116 to be adjusted angularly from almost 360° away from the detent 1124 to within a few degrees thereof and to be held in such position by securing the rotatable member not shown; thus the number of cycles which the machine will perform before the counter counts out is determinable in advance and these counting mechanisms usually have a dial with numbers which can be set to the exact number of cycles desired.

When the last described circuits are closed, the pawls 1114 and 1115 engage the ratchet wheel 1116 and at the same time the pawl 1114 is retracted. Later on when the ejector operates, the coil 1103 will be deenergized thus permitting the spring 1123 to thrust the pawl 1114 to the right picking one tooth of the ratchet wheel 1116. However, energization of the relay pawl coil 1095 also closes the switches 1107 and 1108 and therefore current now flows through the main control solenoid 843 to send the slide 38 inwardly in the following manner: from the power line 790 by way of a wire 1135 to one terminal of the switch 1107 then by way of a wire 1136 to a wire 1137 which is connected to one terminal of the switch 1009, then by way of such switch and through the wires 1053, 1052, 1051 to the switch 1043 and through it to the wire 1049 then through the switch 1041 and through the wires 1047, 1020 and 1021 to the solenoid 843 then by the wire 1022 to the power line 791.

Energization of the solenoid 843 sends the slide 38 in and the slide is sent out again by the shifting of the switches 1040 and 1041 in the manner already described and it is again sent in by the shifting of the switches 1042 and 1043 and so on for the required number of cycles. The ejector mechanism operates in the manner already described by the alternate shifting of the switches 1070 and 1071 and of the switches 1076 and 1077.

When the slide 38 is moving in, the normally closed switch 1101 is open because a relay 1140 which controls it is energized as follows: from the power line 791 by way of a wire 1141 to the relay 1140 by way of the wire 1073 and then for example by way of wire 1074 switch 1076 wire 1078 switch 1070 wire 1080 and wire 1082 to the switch 1057 and by way of the wire 1083 to the power line 790. It will of course be understood that for the path from the wire 1073 to the wire 1082 the current on every other cycle flows through the wire 1075 the switch 1077 the wire 1079 the switch 1071 and the wire 1081. But for the operation of the ejector the circuit from wire 1073 to the wire 1082 is broken once during each cycle. Therefore the relay 1140 is deenergized once during each cycle and that permits momentary energization of the actuating coil 1103 which causes the pawl 1114 to pick one tooth of the ratchet wheel 1116.

When the cam 1130 engages and moves the detent 1124 the counter has counted out. It will be noted that the counting out occurs when the pawl 1114 moves to the right which is occasioned by deenergization of the actuating coil 1103 which occurs when the ejector goes back. So therefore just after the ejector has ejected the work piece namely as the ejector starts back, the relay pawl coil 1095 goes dead and this opens the switches 1107 and 1108.

The switch 1108, whenever the relay pawl coil 1095 is alive, energizes the solenoid 807 which as already described causes the diamond 424 to move whenever the solenoid 807 is either energized or deenergized. This circuit is as follows: from the power line 790 through the wire 1090 through the switch 1058 through the wire 1091 to a wire 1145 to one terminal of the switch 1108 and then through this switch to a wire 1146 through the solenoid 807 and then by a wire 1147 to the power line 791.

Supposing the machine were idle and the operator started a grinding operation with automatic grinding and automatic truing, as he set the knobs 1006 and 1060 the solenoid 807 would be energized. Assuming that the truing slide 407 is in the near position as it should be, the energization of the solenoid 807 would start compensating and dressing but the operator coincidentally with turning the second of these switches 1006 and 1060 swings the valve handle 411 to prevent such action. Thereafter, when the solenoid 807 goes dead which happens just after the ejector has ejected a work piece, compensating and truing in the manner already described takes place.

The switch 1093 is automatically connected to a switch 1150 so that whenever the switch 1093 is closed the switch 1150 is open and vice versa. These switches are in a switch box 1151 (see Figure 22) secured to some part of the slide 382 and they are operated by a switch arm 1152 which is operated by an arm 1153 secured to the slide 407. See also Figures 16 and 17. When the truing slide 407 is forward, the arm 1153 is in contact with the switch arm 1152 holding the switches 1093 and 1150 in the position shown in Figure 24. When, however, the truing slide 407 moves to the rear, the arm 1153 moves away from the arm 1152 and then the switch 1093 opens and the switch 1150 closes.

Spaced from the box 1151 by a distance about equal to the stroke of the slide 407 is a switch box 1155 which is also secured to some part of the slide 382. This box is diagrammatically indicated in Figure 22. Referring now to Figure 24, in this switch box 1155 is a switch 1156 which, as shown in Figure 22, is operated by a switch arm 1157 which in turn is operated by the arm 1153.

When the switch 1150 is closed by the retreat of the arm 1153, power from the power line 790 is made available through the wire 1090 the switch 1058 the wire 1091 a wire 1159 through the switch 1150 to a wire 1160 which leads to one terminal of a switch 1161, but this switch 1161 is open until the switch 1156 is closed which happens when the slide 407 arrives at its rearmost position. Then power from the line 1091 passes through the switch 1156 and through a wire 1162 to a relay 1163 and by way of a wire 1164 to the power line 791 thus energizing the relay 1163 and closing the switch 1161 which sends current to the truing solenoid 807 as follows: by way of a wire 1165 leading from the switch 1161 to the wire 1146 which is connected to the solenoid 807 and through the solenoid 807 and the wire 1147 to the power line 791. This energizes the solenoid 807 which causes the truing slide 407 to start toward the front of the machine. As it does so, the switch 1156 opens but this does not break the circuit because a holding circuit is provided by way of a wire 1166 which connects the wire 1165 to the same terminal of the relay 1163 which is connected to the wire 1162. This holding circuit is from power line 790 by wire 1090 switch 1058 wire 1091 wire 1159 switch 1150 wire 1160 switch 1161 wire 1165 wire 1166 relay 1163 and wire 1164 to the power line 791. Since the switch 1150 is in the holding circuit whenever the slide 407 reaches the front end of its travel, the holding circuit is broken by opening of the switch 1150 and so therefore the relay 1163 goes dead and the switch 1161 is opened. But as the switch 1150 opens, the switch 1093 closes and this energizes the relay pawl coil 1095 which closes the switch 1108 holding the solenoid 807 energized until the counter again counts out following the next series of cycles of grinding. Furthermore, by way of circuits already described, the counter again starts to operate and the wheel slide 38 moves in.

It is noted that during truing the switch 1107 is open so the circuit 790, 1135, 1107, 1136, 1080, 1070, 1078, 1076, 1074, 1073, 905, 1072, 791 through the ejector solenoid 905 is broken and the ejector rod 668 stays forward until the truing is completed. This will prevent a magazine attachment connected to this machine from feeding a work piece into the machine at this time.

It will now be appreciated that the grinding machine of this invention is a highly versatile machine which can be set up for through feed grinding and which can be set up for infeed grinding in a number of different ways. The regulating wheel can be placed parallel with or at an angle to the grinding wheel in two different planes. The grinding wheel can readily be trued to a taper or into special shapes such as a stepped shape and furthermore the side face of the grinding wheel can be trued at an angle. Truing of the grinding wheel can be performed automatically or by hand as desired. The regulating wheel can quickly be trued at any time desired simply by moving a lever. All motions take place smoothly because operated by hydraulic mechanisms. Furthermore, the rate at which the various feeds and traverses occur can be accurately controlled. Very fine finishes can be obtained because of the slow final infeed and the means for providing a dwell to permit the wheel to spark out coupled with the means for slowing down the regulating wheel at the end of a grinding operation upon a particular work piece. Furthermore, the reciprocating spindle motion and the use of a tapered grinding wheel contribute to produce such fine finishes.

The grinding wheel is driven to rotate clockwise, Figure 1. During grinding, the regulating wheel should also be rotating clockwise, Figure 1. Therefore the motor 214 rotates in such direction as to rotate the regulating wheel clockwise, Figure 1, when the oil is flowing out of the motor through the pipe 733 and the throttle valve 739. Consequently also when the oil is flowing through the check valve 738 to cause the motor 214 to rotate the regulating wheel 70 at high speed, the regulating wheel 70 is rotating counter-clockwise. There is sometimes a little oil leakage in an hydraulic motor which may be a piston type motor and so I preferably provide a drain pipe 1170 connecting the casing of the motor 214 with the exhaust pipe 729.

Figure 25:
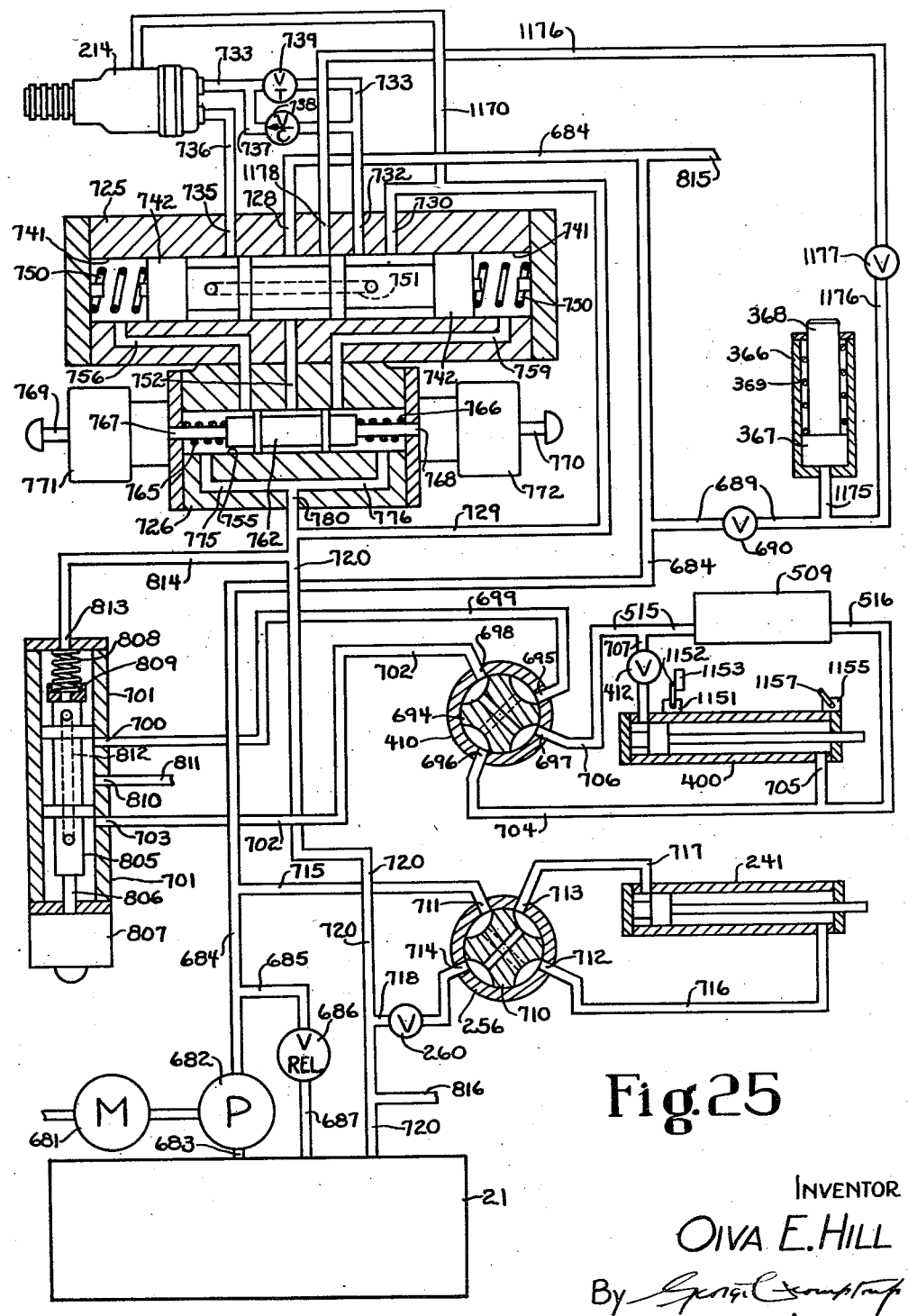
Figure 25 is a diagram of the hydraulic mechanism and connections similar to Figure 22 but illustrating a modification of the invention.

Referring now to Figures 25 and 26, a modification of the invention is illustrated wherein the wheel spindle reciprocating mechanism is put out of action automatically only when the truing of the grinding wheel takes place automatically. According to this modification of the invention the pipe 691 in Figure 23 is plugged. That is to say according to the modification there is no pipe 691 connecting the pipe 856 with the cylinder 366.

Referring now to Figure 25, the pipe 689 is connected to a pipe 1175 which is connected to the cylinder 366 and the pipe 1175 is also connected to a pipe 1176 having therein a hand valve 1177 leading to a port 1178 in the valve casing 725. When the valve piston 742 is in its central position as shown in Figure 25, the port 1178 is connected to the pressure port 728 and therefore, if the valve 1177 is open as it should be when doing automatic grinding with automatic truing, the cylinder 366 will be under pressure and the automatic grinding spindle reciprocator will be out of action. However when the solenoid 771 is energized the valve piston 742 is to the left and at such time the port 1178 is connected to exhaust and consequently if the valve 690 is closed, the wheel spindle will reciprocate.

Referring now to Figure 26, this wiring diagram is in most respects the same as the wiring diagram of Figure 24 but it will be noted that the wire 1091 between 1159 and 1092 is cut and there is a wire 1201 between the wire 1159 and the main line 790. It will further be noted that there is a wire 1202 from the wire 1094 to one terminal of the hand switch 792 in place of the wire 794 of Figure 24 which ran to the line 799. Now as the diamond 424 starts toward the grinding wheel 50, the switch 1093 opens and the only circuit through the solenoid 771 is from main line 791, wire 795, switch 792, wire 1202, wire 1094, switch 1093, wire 1092, wire 1091, switch 1058, wire 1090 to main line 790 so as this is broken the valve 742 centers (stopping the regulating wheel) and this allows fluid to flow by way of the port 1178 and pipe 1176 to pipe 1175 to cylinder 366 operating the piston 367 to stop the reciprocation of the grinding wheel. Whenever the truing slide has returned the switch 1093 is again closed which starts up the reciprocations of the grinding wheel and starts the regulating wheel.

In the claims I have used the word line to refer to one or a plurality of pipes. Various piston and cylinder units are sometimes referred to in the claims as motors. A wire or wires are sometimes referred to as connections and a pipe or pipes are sometimes referred to as connections. Also in the claims the grinding wheel slide 38 is frequently referred to as a main slide.

It will thus be seen that there has been provided by this invention a centerless grinder in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a centerless grinder, a regulating wheel spindle, a fluid pressure actuated hydraulic motor connected to rotate said spindle, fluid pressure connections to operate said motor including two main lines to convey fluid and exhaust it from said motor, a shunt line in parallel with one of said main lines, a check valve, a throttle valve, one of said valves being in the shunt line and the other of said valves being in the main line in parallel with the shunt line, and a reversing valve connected to the main lines beyond the check valve and the throttle valve, whereby with the reversing valve in one position the motor will be operated at high speed in one direction of rotation and with the reversing valve in the other position the motor will be operated at a speed determined by the setting of the throttle valve and in an angular direction opposite to said first named direction.

2. In a centerless grinder, a grinding wheel, a spindle therefor, journal bearings for said spindle, a regulating wheel, a spindle therefor, journal bearings for said spindle, means for moving one of said bearings toward the other one at first at high speed and then at adjusted slow speed, means for rotating the regulating wheel, controlling means for said last mentioned means, further means automatically set in operation after said bearing is moving at slow speed operating upon said controlling means to slow down the rotation of said regulating wheel at the end of the adjusted slow speed movement of one of said wheels.

3. In a centerless grinder, a truing tool post, a pair of diamonds mounted on said post for one for truing the periphery of a grinding wheel and the other for truing a side face of the grinding wheel, a spindle mounting the grinding wheel to be trued, means mounting the tool post for rectilinear movement the line of said rectilinear movement being at a small angle from perpendicular to the axis of said spindle whereby one of the diamonds can be moved to true off the side of the grinding wheel to a flat cone, a slide also mounting the truing post and movable parallel to the axis of the spindle, and guide means to give the tool post a compound movement by movement of the slide and also the aforesaid rectilinear movement whereby the other diamond can be caused to true the periphery of the grinding wheel to a conical taper such that elements of the two cones are perpendicular to each other.

4. In a centerless grinder, a regulating wheel spindle, a housing for said regulating wheel spindle, journals for said spindle in said housing, a mounting for said housing permitting it to be angularly adjusted on an axis perpendicular to the axis of said spindle, a truing tool post for truing the regulating wheel, a pair of slides mounting said truing tool post said slides being at an angle to each other, and a skew bar to guide the movement of said post along said slides to true said regulating wheel to a right circular cylinder or a hyperboloid as described.

5. In a centerless grinder, a grinding wheel spindle, a slide for said grinding wheel spindle, a piston and cylinder to move said slide, a solenoid to initiate movement of said slide, a pilot valve operated by said solenoid, a main control valve operated by said pilot valve, a slide controlling valve operated by said main control valve, and fluid pressure connections between said several valves whereby the slide is caused to move in one direction by energization of the solenoid and in the opposite direction by de-energization of the solenoid.

6. In a centerless grinder as claimed in claim 5, the combination with the parts and features therein specified of a fine feed mechanism for the slide, a piston and cylinder unit to operate said fine feed mechanism, and fluid pressure connections from one of said valves to operate said piston and cylinder unit.

7. In a centerless grinder, a grinding wheel, a regulating wheel, a wheel slide to move one of the wheels relative to the other, a nut journalled in said wheel slide, a screw shaft passing through said nut, a base for the grinder, journals for the screw shaft in the base, a hand wheel and spline connections for rotating the screw shaft, automatic compensating mechanism to rotate the nut, and a cylinder and piston unit to move the screw shaft axially.

8. In a centerless grinder as claimed in claim 7, the combination with the parts and features therein specified, of a fine feed mechanism to limit the motion of the cylinder and piston unit to a fine feed, and another cylinder and piston unit to operate said fine feed.

9. In a grinding machine, a slide, a cylinder and piston unit to control movement of said slide, a pair of maintain contact switches in position to be operated by said unit when the piston is in one extreme position in the cylinder, a second pair of maintain contact switches in position to be operated by said unit when the piston is at the other extreme position in the cylinder, each pair of switches being so connected and arranged that when one switch thereof is open the other thereof is closed, a valve and connections to operate the cylinder and piston unit, a solenoid to operate the valve, a pair of main electrical power lines, parallel connections from said power lines through said switches to said solenoid such that one connection runs through one each of the switches of the pairs and the other connection runs through the other of each of the switches of the pairs whereby to reciprocate the unit and thereby to control the slide.

10. In a grinding machine, a truing tool post, a fluid motor to move said truing tool post across a grinding wheel to true the same, said fluid motor having two ports so that when fluid is introduced into one port and exhausted from the other port the post moves across the wheel in a given direction and when fluid is introduced into the other port and exhausted from the one port the post moves across the wheel in a direction opposite to the given direction, a pressure line, an exhaust line, and a pair of four way reversing valves in series between said pressure line and exhaust line and the ports of said fluid motor, whereby when either of said valves is changed from one position to the other said post will move across the wheel and stop until one of the valves is changed again.

11. In a centerless grinder, a grinding wheel and means to rotate it at a high speed in a given direction of rotation, a work rest adjacent the grinding wheel having a work rest surface towards which the grinding wheel moves, a regulating wheel on the side of the work rest opposite the grinding wheel and means to rotate the regulating wheel in said given direction of rotation and at relatively slow speed, and means to reverse the direction of rotation of the regulating wheel so that it moves in the opposite angular direction from that of the grinding wheel at high speed.

12. In a centerless grinder, a grinding wheel and means to rotate it at a high speed in a given direction of rotation, a work rest adjacent the grinding wheel having a work rest surface towards which the grinding wheel moves, a regulating wheel on the side of the work rest opposite the grinding wheel, means to rotate the regulating wheel in the given direction of rotation and at relatively slow speed, a main slide supporting one of said wheels for movement toward the other thereof, a screw shaft and a rotatable nut thereon to move said main slide, means for fluid pressure moving said screw shaft axially to give a relatively large infeed said shaft being rotatable for relatively fine adjustment, a truing tool post, a slide for said truing tool post to move it across the periphery of the grinding wheel, a second screw shaft for moving the truing tool post by slight increments toward the grinding wheel, and a compensating mechanism connected to rotate the nut to move the main slide and also to rotate the second screw shaft whereby to move the truing tool post by a slight increment toward the grinding wheel.

13. In a centerless grinder as claimed in claim 12, the combination with the parts and features therein specified of a counting mechanism connected to count one for every relatively large infeed, and means operated when said counting mechanism counts out to actuate said compensating mechanism.

14. In a centerless grinder as claimed in claim 13, the combination with the parts and features therein specified of a fluid pressure motor to move the slide for the truing tool post.

15. In a centerless grinder as claimed in claim 14, the combination with the parts and features therein specified of a fluid pressure motor forming part of the compensating mechanism.

16. In a centerless grinder as claimed in claim 15, the combination with the parts and features therein specified of a piston and cylinder unit as part of the means for giving a relatively large infeed.

17. In a centerless grinder as claimed in claim 16, the combination with the parts and features therein specified of additional means for controlling the cylinder and piston to slow down the infeed to a fine feed when the work piece is near size.

18. In a centerless grinder as claimed in claim 12, the combination with the parts and features therein specified of a piston and cylinder unit as part of the means for giving a relatively large infeed, and additional means for controlling the cylinder and piston to slow down the infeed to a fine feed when the work piece is near size.

19. In a centerless grinder as claimed in claim 18, the combination with the parts and features therein specified of a cylinder and piston and eccentric as part of the additional means for controlling the cylinder and piston to slow down the infeed to a fine feed.

20. In a centerless grinder as claimed in claim 19, the combination with the parts and features therein specified of a counting mechanism connected to count one for every relatively large infeed, and means operated when said counting mechanism counts out to actuate said compensating mechanism.

21. In a centerless grinder as claimed in claim 20, the combination with the parts and features therein specified of means to move the slide for the truing tool post when the counting mechanism counts out.

22. In a centerless grinder as claimed in claim 21, the combination with the parts and features therein specified of a fluid pressure motor to move the slide for the truing tool post.

23. In a centerless grinder as claimed in claim 22, the combination with the parts and features therein specified of a fluid pressure motor forming part of the compensating mechanism.

24. In a centerless grinder, a grinding wheel and means to rotate it at a relatively high speed, a regulating wheel, a slide mounting one of said wheels for movement towards the other, a fluid motor to control the motion of said slide, a fluid motor to rotate said regulating wheel, a throttle valve to control the speed of said fluid motor for the regulating wheel and means to turn said throttle valve operating when the fluid motor to control the slide is operating thus to decelerate the regulating wheel at the end of a grinding operation.

25. In a centerless grinder, a grinding wheel spindle, journals for said grinding wheel spindle, a mechanism to reciprocate said grinding wheel spindle in said journals, a regulating wheel spindle, a main slide supporting one of said spindles for infeed and withdrawal, and hydraulic means responsive to withdrawal of the main slide for stopping the wheel spindle reciprocating mechanism.

26. In a centerless grinder, an ejector rod, a main slide, a detent connected to the ejector rod, a detent connected to be operated when the main slide moves, a pair of maintain contact switches operated by said first detent, a pair of maintain contact switches operated by said second detent, a solenoid to control operation of the ejector rod, a pair of power lines, and connections in parallel from said power lines to said solenoid through said maintain contact switches whereby movement of the main slide operates the ejector rod and the ejector rod's own movement causes it to reset.

27. In a grinder, a grinding wheel spindle, means to support a work piece, mechanism to feed one of the aforesaid towards and away from the other thereof in a continuous succession of feeding cycles, a counting mechanism to count the cycles, a reciprocator for the grinding spindle to reciprocate it, and means operated by the counting mechanism when it counts out to stop the reciprocator.

28. In a grinder as claimed in claim 27, the combination with the parts and features therein specified of truing apparatus for the grinding wheel and means operated by the counting mechanism when it counts out for initiating the operation of said truing apparatus.

29. In a centerless grinder, a grinding wheel and means to rotate it at a high speed in a given direction of rotation, a work rest adjacent the grinding wheel having a work rest surface towards which the grinding wheel moves, a regulating wheel on the side of the work rest opposite the grinding wheel and means to rotate the regulating wheel in the given direction of rotation and at relatively slow speed, a main slide supporting one of said wheels for movement toward the other thereof, actuating means for said main slide including a piston and cylinder unit for giving a relatively large infeed and means for relatively fine adjustment, a truing tool post, a slide for said truing tool post to move it across the periphery of the grinding wheel, means for moving the truing tool post by slight increments toward the grinding wheel, a compensating mechanism to actuate the means for relatively fine adjustment and also the means for moving the truing tool post by slight increments toward the grinding wheel, and additional means including another cylinder and piston and an eccentric for controlling the first named piston and cylinder unit to slow down the infeed to a fine feed when the work piece is near size.

30. In a centerless grinder as claimed in claim 29, the combination with the parts and features therein specified of a counting mechanism connected to count one for every relatively large infeed, and means operated when said counting mechanism counts out to actuate said compensating mechanism.

31. In a centerless grinder as claimed in claim 30, the combination with the parts and features therein specified of means to move the slide for the truing tool post when the counting mechanism counts out.

32. In a centerless grinder as claimed in claim 31, the combination with the parts and features therein specified of a fluid pressure motor to move the slide for the truing tool post.

33. In a centerless grinder as claimed in claim 32, the combination with the parts and features therein specified of a fluid pressure motor forming part of the compensating mechanism.

34. In a centerless grinder, a grinding wheel spindle and means to rotate it at a high speed, a regulating wheel spindle, a fluid motor connected to revolve said regulating wheel spindle, a pressure line, an exhaust line, a four way reversing valve connecting said pressure line and said exhaust line to said fluid motor, electric means to operate said reversing valve whereby to run said fluid motor in either direction, a throttle valve and a check valve in parallel between said reversing valve and one side of said motor whereby when the motor is operated in such direction that it rotates the regulating wheel spindle in the same direction as the grinding wheel spindle said motor is under the control of the throttle valve and when the motor is operated in the opposite direction it is not under the control of said throttle valve.

35. In a centerless grinder for grinding shouldered work pieces, a grinding wheel having an axis and having an abrasive side face as well as an abrasive periphery, means rotatably mounting said grinding wheel with said axis horizontal and for rotation about said axis, a swivel table to one side of the axis of the grinding wheel, means mounting said swivel table for angular adjustment on a vertical axis, a regulating wheel, means rotatably mounting said regulating wheel, a support for the last named means adjustable on a horizontal axis which is perpendicular to the vertical plane through the axis of rotation of the grinding wheel thereby to set the axis of the regulating wheel at will at a skew angle to the grinding wheel or parallel to the axis of the grinding wheel, a truing diamond, means mounting said diamond for movement in contact with the side face of the grinding wheel at a small angle to a line radial to the axis of the grinding wheel, a second truing diamond, and means mounting said second truing diamond for movement in contact with the periphery of the disc of the grinding wheel at a slight angle to a line parallel to the axis of the grinding wheel, whereby to true said grinding wheel to slightly non-cylindrical shape and by adjusting the swivel table so that the axis of the regulating wheel in a horizontal plane is non-parallel to the axis of the grinding wheel shouldered work pieces can be ground and the grinding wheel trued from time to time without making it successively thinner at the periphery.

OIVA E. HILL.

REFERENCES CITED

The following references are of record in the file of this patent:

UNITED STATES PATENTS

| Number | Name | Date |
|---|---|---|
| 1,573,153 | Garrison | Feb. 16, 1926 |
| 1,733,092 | Einstein | Oct. 22, 1929 |
| 1,933,028 | Raule | Oct. 31, 1933 |
| 1,938,765 | Haas | Dec. 12, 1933 |
| 1,953,912 | Theriault | Apr. 3, 1934 |
| 1,961,849 | Fraser | June 5, 1934 |
| 1,976,114 | Booth | Oct. 9, 1934 |
| 2,004,426 | Booth et al. | June 11, 1935 |
| 2,116,794 | LaFleur | May 10, 1938 |
| 2,117,917 | Silven | May 17, 1938 |
| 2,192,308 | Greiner et al. | Mar. 5, 1940 |
| 2,244,057 | Ekholm | June 3, 1941 |
| 2,267,391 | Astrowski | Dec. 23, 1941 |
| 2,292,947 | Kasparson et al. | Aug. 11, 1942 |
| 2,318,799 | Price et al. | May 11, 1943 |
| 2,397,131 | Decker et al. | Mar. 26, 1946 |
| 2,417,707 | Seyferth et al. | Mar. 18, 1947 |
| 2,418,149 | Addicks et al. | Apr. 1, 1947 |
| 2,419,940 | Balsiger et al. | May 6, 1947 |

FOREIGN PATENTS

| Number | Country | Date |
|---|---|---|
| 664,143 | Germany | Aug. 20, 1938 |